US006829062B2

(12) United States Patent
Asamura et al.

(10) Patent No.: US 6,829,062 B2
(45) Date of Patent: Dec. 7, 2004

(54) COLOR CONVERSION DEVICE AND COLOR CONVERSION METHOD

(75) Inventors: Masako Asamura, Tokyo (JP); Shuichi Kagawa, Tokyo (JP); Yoshiko Hatano, Tokyo (JP); Hiroaki Sugiura, Tokyo (JP); Kazuya Maeshima, Tokyo (JP); Takashi Okamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 98 days.

(21) Appl. No.: 10/167,462

(22) Filed: Jun. 13, 2002

(65) Prior Publication Data

US 2003/0016373 A1 Jan. 23, 2003

Related U.S. Application Data

(62) Division of application No. 09/293,180, filed on Apr. 16, 1999, now Pat. No. 6,434,268.

(30) Foreign Application Priority Data

Apr. 20, 1998 (JP) ............................................ 10-109299

(51) Int. Cl.$^7$ ............................ G06K 15/00; H04N 1/46
(52) U.S. Cl. ...................... 358/1.9; 358/518; 358/520
(58) Field of Search ................................ 382/162, 167, 382/254, 274; 358/500, 518, 519, 520, 523, 1.9

(56) References Cited

U.S. PATENT DOCUMENTS

| 4,639,770 A | 1/1987 | Jung et al. .................... 358/76 |
| 4,740,833 A | 4/1988 | Shiota et al. ................. 358/80 |
| 4,887,150 A | 12/1989 | Chiba et al. ................. 358/523 |
| 4,989,079 A | 1/1991 | Ito ............................... 358/80 |
| 5,436,733 A | 7/1995 | Terada et al. ............... 358/448 |
| 5,588,050 A * | 12/1996 | Kagawa ....................... 382/167 |
| 5,659,406 A | 8/1997 | Imao et al. .................. 358/518 |
| 5,729,636 A | 3/1998 | Kagawa et al. ............. 382/274 |
| 5,933,252 A | 8/1999 | Emori et al. ................ 358/500 |
| 5,943,143 A * | 8/1999 | Kawai ........................ 358/520 |
| 5,963,201 A * | 10/1999 | McGreggor et al. ........ 345/722 |
| 5,991,511 A * | 11/1999 | Granger ..................... 358/1.9 |
| 6,125,202 A | 9/2000 | Kagawa et al. ............. 382/167 |
| 6,320,668 B1 * | 11/2001 | Kim ........................... 358/1.1 |
| 6,459,449 B1 * | 10/2002 | Juen ........................... 348/223 |

FOREIGN PATENT DOCUMENTS

| EP | 1028586 A | 8/2000 | ............ H04N/1/60 |
| GB | 2 050 751 A | 1/1981 | ............ H04N/1/46 |
| JP | 63-39188 B2 | 8/1988 | |
| JP | 63-227181 A | 9/1988 | |
| JP | 230226 B2 | 7/1990 | |
| JP | 548885 | 2/1993 | |
| JP | 5-183742 | 7/1993 | ............ H04N/1/40 |
| JP | 7-023245 | 1/1995 | ............ H04N/1/60 |
| JP | 7170404 | 7/1995 | |
| JP | 8-321964 | 12/1996 | ............ H04N/1/60 |
| JP | 11-17974 | 1/1999 | ............ H04N/1/60 |
| JP | 11-308472 | 11/1999 | ............ H04N/1/60 |

* cited by examiner

Primary Examiner—Jerome Grant, II
(74) Attorney, Agent, or Firm—Birch, Stewart, Kolasch, & Birch, LLP.

(57) ABSTRACT

By changing coefficients of second-order and first-order calculation terms relating to respective hues, and first-order calculation terms in the form of comparison-result data relating to respective inter-hue areas, only the target hue or inter-hue area among the six hues of red, blue, green, yellow, cyan, and magenta, and the six inter-hue areas can be varied, without affecting other hues and inter-hue areas. Thus, the six hues and six inter-hue areas can be corrected independently, and the large-capacity memory is not required.

33 Claims, 30 Drawing Sheets

$T1 = P1 \times P2$ $T2 = \dfrac{P1 \times P2}{P1 + P2}$ $T3 = Q1 \times Q2$ $T4 = \dfrac{Q1 \times Q2}{Q1 + Q2}$ $T5 = \min(Q1, \min(aq \times Q2, aq \times P2))$

FIG.3

| IDENTIFICATION CODE S1 | MAXIMUM $\beta$ | MINIMUM $\alpha$ | HUE DATA WHICH IS ZERO* |
|---|---|---|---|
| 0 | Ri | Gi | g、c |
| 1 | Ri | Bi | b、c |
| 2 | Gi | Ri | r、m |
| 3 | Gi | Bi | b、m |
| 4 | Bi | Ri | r、y |
| 5 | Bi | Gi | g、y |

*r=Ri-$\alpha$、g=Gi-$\alpha$、b=Bi-$\alpha$
y=$\beta$-Bi、m=$\beta$-Gi、c=$\beta$-Ri

FIG.4

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

| HUE | EFFECTIVE SECOND-ORDER TERM | EFFECTIVE FIRST-ORDER TERM |
|---|---|---|
| RED | m×y | m×y/(m+y) |
| GREEN | y×c | y×c/(y+c) |
| BLUE | c×m | c×m/(c+m) |
| CYAN | g×b | g×b/(g+b) |
| MAGENTA | b×r | b×r/(b+r) |
| YELLOW | r×g | r×g/(r+g) |

FIG.10B

| INTER-HUE AREA | EFFECTIVE CALCULATION TERM IN THE FORM OF COMPARISON-RESULT DATA |
|---|---|
| RED-YELLOW | min(r, hry) |
| YELLOW-GREEN | min(g, hgy) |
| GREEN-CYAN | min(g, hgc) |
| CYAN-BLUE | min(b, hbc) |
| BLUE-MAGENTA | min(b, hbm) |
| MAGENTA-RED | min(r, hrm) |

$T1 = P1 \times P2$ $T2 = \dfrac{P1 \times P2}{P1 + P2}$ $T3 = Q1 \times Q2$ $T4 = \dfrac{Q1 \times Q2}{Q1 + Q2}$ $T5' = \min(P1, \min(aq \times Q2, ap \times P2))$

FIG.17A

| HUE | EFFECTIVE SECOND-ORDER TERM | EFFECTIVE FIRST-ORDER TERM |
|---|---|---|
| RED | m×y | m×y/(m+y) |
| GREEN | y×c | y×c/(y+c) |
| BLUE | c×m | c×m/(c+m) |
| CYAN | g×b | g×b/(g+b) |
| MAGENTA | b×r | b×r/(b+r) |
| YELLOW | r×g | r×g/(r+g) |

FIG.17B

| INTER-HUE AREA | EFFECTIVE CALCULATION TERM IN THE FORM OF COMPARISON-RESULT DATA |
|---|---|
| RED-YELLOW | min(y, hry) |
| YELLOW-GREEN | min(y, hgy) |
| GREEN-CYAN | min(c, hgc) |
| CYAN-BLUE | min(c, hbc) |
| BLUE-MAGENTA | min(m, hbm) |
| MAGENTA-RED | min(m, hrm) |

T1=P1×P2
T3=Q1×Q2
T5=min(Q1,min(aq×Q2,ap×P2))
T6=min(P1,P2)
T7=min(Q1,Q2)

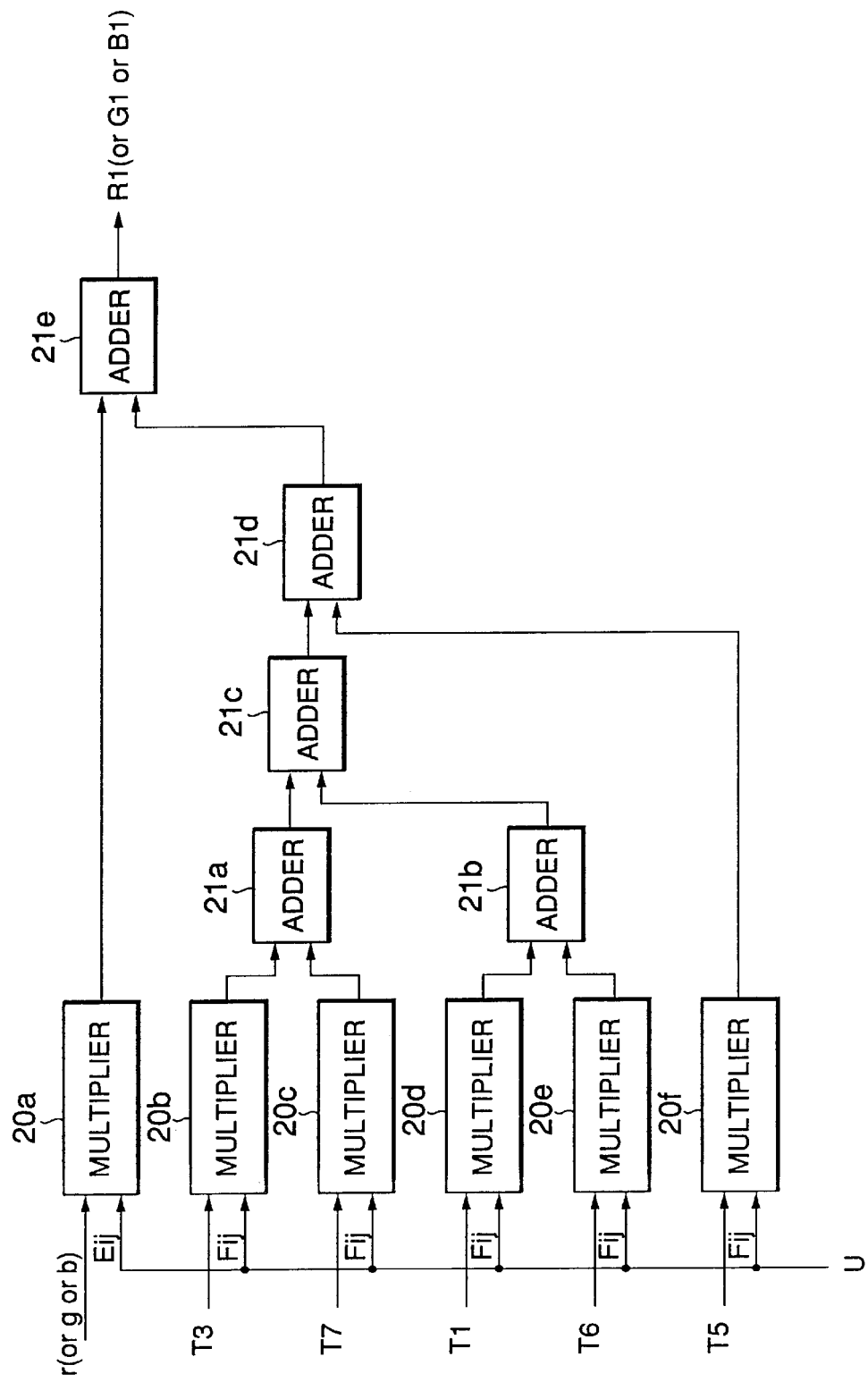

FIG.22A

| HUE | EFFECTIVE SECOND-ORDER TERM | EFFECTIVE FIRST-ORDER TERM |
|---|---|---|
| RED | m×y | min(m, y) |
| GREEN | y×c | min(y, c) |
| BLUE | c×m | min(c, m) |
| CYAN | g×b | min(g, b) |
| MAGENTA | b×r | min(b, r) |
| YELLOW | r×g | min(r, g) |

FIG.22B

| INTER-HUE AREA | EFFECTIVE CALCULATION TERM IN THE FORM OF COMPARISON-RESULT DATA |
|---|---|
| RED-YELLOW | min(r, hry) |
| YELLOW-GREEN | min(g, hgy) |
| GREEN-CYAN | min(g, hgc) |
| CYAN-BLUE | min(b, hbc) |
| BLUE-MAGENTA | min(b, hbm) |
| MAGENTA-RED | min(r, hrm) |

T1=P1×P2
T3=Q1×Q2
T5'=min(P1,min(aq×Q2,ap×P2))
T6=min(P1,P2)
T7=min(Q1,Q2)

FIG.28A

| HUE | EFFECTIVE SECOND-ORDER TERM | EFFECTIVE FIRST-ORDER TERM |
|---|---|---|
| RED | m×y | min(m, y) |
| GREEN | y×c | min(y, c) |
| BLUE | c×m | min(c, m) |
| CYAN | g×b | min(g, b) |
| MAGENTA | b×r | min(b, r) |
| YELLOW | r×g | min(r, g) |

FIG.28B

| INTER-HUE AREA | EFFECTIVE CALCULATION TERM IN THE FORM OF COMPARISON-RESULT DATA |
|---|---|
| RED-YELLOW | min(y, hry) |
| YELLOW-GREEN | min(y, hgy) |
| GREEN-CYAN | min(c, hgc) |
| CYAN-BLUE | min(c, hbc) |
| BLUE-MAGENTA | min(m, hbm) |
| MAGENTA-RED | min(m, hrm) |

COLOR CONVERSION DEVICE AND COLOR CONVERSION METHOD

This application is a divisional of co-pending application Ser. No. 09/293,180, filed on Apr. 16, 1999, the entire contents of which are hereby incorporated by reference and for which priority is claimed under 35 U.S.C. § 120; and this application claims priority of application Ser. No. 1092998/98 filed in Japan on Apr. 20, 1998 under 35 U.S.C. § 119.

BACKGROUND OF THE INVENTION

The present invention relates to data processing used for a full-color printing related equipment such as a printer, a video printer, a scanner or the like, an image processor for forming computer graphic images or a display device such as a monitor. More specifically, the invention relates to a color conversion device and a color conversion method for performing color conversion for image data of three colors of red, green and blue in accordance with an equipment used.

Color conversion in printing is an indispensable technology for compensating for deterioration of image quality such as that due to color mixing properties caused by factors such as that the ink is not of a pure color, or non-linearity (in the hue) of he image-printing, and to output a printed image with a high color reproducibility. Also, in a display device such as a monitor or the like, color conversion is performed in order to output (display) an image having desired color reproducibility in accordance with conditions the device is used or the like when an inputted color signal is to be displayed.

Conventionally, two methods have been available for the foregoing color conversion: a table conversion method and a matrix calculation method.

The table conversion method is a method for inputting image data of red, green and blue (referred to "R, G and B", hereinafter) and obtaining image data of R, G and B stored beforehand in a memory such as ROM or complementary color data of yellow, magenta and cyan (referred to as "Y, M and C", hereinafter). Since an arbitrary conversion characteristic can be employed, this table conversion method has an advantageous capability of executing color conversion with good color reproducibility.

However, in a simple structure for storing data for each combination of image data, a large-capacity memory of about 400 Mbit must be used. For example, even in the case of a compression method for memory capacity disclosed in Japanese Patent Kokai Publication No. S63-227181, memory capacity is about 5 Mbit. Therefore, a problem inherent in the table conversion system is that since a large-capacity memory is necessary for each conversion characteristic, it is difficult to implement the method by means of an LSI, and it is also impossible to deal with changes in the condition under which the conversion is carried out.

On the other hand, in the case of the matrix calculation method, for example, for obtaining printing data of Y, M and C from image data of R, C and B, the following formula (27) is used as a basic calculation formula.

$$\begin{bmatrix} Y \\ M \\ C \end{bmatrix} = (Aij) \begin{bmatrix} R \\ G \\ B \end{bmatrix} \quad (27)$$

Here, i=1 to 3, and j=1 to 3.

However, by the simple linear calculation of the formula (27), it is impossible to provide a good conversion characteristic because of a non-linearity of an image-printing or the like.

A method has been proposed for providing a conversion characteristic to improve the foregoing characteristic. This method is disclosed in Japanese Patent Application Kokoku Publication H2-30226, directed to "color correction calculation device, and employs a matrix calculation formula (28) below.

$$\begin{bmatrix} Y \\ M \\ C \end{bmatrix} = (Dij) \begin{bmatrix} R \\ G \\ B \\ R*G \\ G*B \\ B*R \\ R*R \\ G*G \\ B*B \\ N \end{bmatrix} \quad (28)$$

Here, N is a constant, i=1 to 3, and j=1 to 10.

In the foregoing formula (28), since image data having a mixture of an achromatic component and a color component is directly used, mutual interference occurs in computation. In other words, if one of the coefficients is changed, influence is given to the components or hues other than the target component or hue (the component or hue for which the coefficient is changed). Consequently, a good conversion characteristic cannot be realized.

A color conversion method disclosed in Japanese Patent Application Kokai Publication H7-170404 is a proposed solution to this problem. FIG. 29 is a block circuit diagram showing the color conversion method for conversion of image da of R, G and B into printing data of C, M and Y, disclosed in Japanese Patent Application Kokai Publication H7-170404. A reference numeral 100 denotes a complement calculator; 101, an minimum and maximum calculator; 102, a hue data calculator; 103, a polynomial arithmetic unit; 104, a matrix calculator; 105, a coefficient generator; and 106, a synthesizer.

Next, the operation will be described. The complement calculator 100 receives image data R, G and B, and outputs complementary color data Ci, Mi and Yi which have been obtained by determining 1's complements. The minimum and maximum calculator 101 outputs a maximum value β and a minimum value α of this complementary color data and an identification code S for indicating, among the six hue data, data which are zero.

The hue data calculator 102 receives the complementary color data Ci, Mi and Yi and the maximum and minimum values β and α, and outputs six hue data r, g, b, y, m and c which are obtained by executing the following subtraction: r=β−Ci, g=β−Mi, b=β−Yi, y=Yi−α, m=Mi−α, and c=Ci−α. Here, among the six hue data, at least two assume the value zero.

The polynomial arithmetic unit 103 receives the hue data and the identification code, selects, from r, g and b, two data Q1 and Q2 which are not zero and, from y, m and c, two data P1 and P2 which are not zero. Based on these data, the polynomial arithmetic unit 103 computes polynomial data: T1=P1*P2, T3=Q1*Q2, T2=T1/(P1+P2), and T4=T3/(Q1+Q2), and then outputs the results of the calculation.

The coefficient generator 105 generates calculation coefficients U(Fij) and fixed coefficients U(Fij) for the polynomial data based on information regarding the identification code S. The matrix calculator 104 receives the hue data y, m and c, the polynomial data T1 to T4 and the coefficients U, and outputs a result of the following formula (29) as color ink data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} \quad (29)$$

The synthesizer 106 adds together the color ink data C1, M1 and Y1 and data α which is the achromatic data, and outputs printing data C, M and Y. Accordingly, the following formula (30) is used for obtaining printing data.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} + \begin{bmatrix} \alpha \\ \alpha \\ \alpha \end{bmatrix} \quad (30)$$

The formula (30) shows a general formula for a group of pixels.

FIG. 30A to FIG. 30F, which are schematic diagrams, show relations between six hues of red (R), green (G), blue (B), yellow (Y), cyan (C) and magenta (M) and hue data y, m, c, r, g and b, and each hue data relates to three hues.

FIG. 31A to FIG. 31F, which are schematic diagrams, show relations between the six hues and product terms y*m, r*g, c*y, g*b, m*c and b*r, and it is seen that each hue data relates to specified hue among the six hues.

Thus, each of the six product terms y*m, m*c, c*y, r*g, g*b and b*r relates to only specific hue among the six hues of red, blue, green, yellow, cyan and magenta. In other words, only y*m is an effective product term for red; m*c for blue; c*y for green; r*g for yellow; g*b for cyan; and b*r for magenta.

Also, each of the six fraction terms y*m/(y+m), m*c/(m+c), c*y/(c+y), r*g/(r+g), g*b/(g+b) and b*r/(b+r) in the formula (30) relates to only a specific hue among the six hues.

As apparent from the foregoing, according to the color conversion method shown in FIG. 29, by changing coefficients for the product terms and the fraction terms regarding the specific hue, only the target hue can be adjusted without influencing to other hues.

Each of the foregoing product terms is determined by a second-order computation for chroma, and each of the fraction terms is determined by a first-order computation for chroma. Thus, by using both of the product terms and the fraction terms, the non-linearity of an image-printing for chroma can be corrected.

However, even in this color conversion method, the problems of the non-linearity of image-printing for hues remains to be solved. Depending on the user's preference, if an area in a color space occupied by specific hues is to be expanded or reduced, e.g., specifically, if expansion or reduction of an area of red in a color space including magenta, red and yellow is desired, the conventional color conversion method of the matrix computation type could not meet with such a desire.

The problems of the conventional color conversion method or color conversion device are summarized as follows. Where the color conversion device is of a table conversion method employing a memory such as ROM, a large-capacity memory is required, and a conversion characteristic cannot be flexibly changed. Where the color conversion device is of using a matrix calculation method, although it is possible to change only a target hue, it is not possible to correct the inter-hue areas between adjacent ones of the six hues of red, blue, green, yellow, cyan and magenta, good conversion characteristics cannot be realized throughout the entire color space.

SUMMARY OF THE INVENTION

The present invention was made to solve the foregoing problems. An object of the present invention is to provide a color conversion device and a color conversion method for performing color-conversion for each pixel of image data R, G and B, wherein independent correction is performed not only for six hues of red, blue, green, yellow, cyan and magenta but also six inter-hue areas of red-yellow, yellow-green, green-cyan, cyan-blue, blue-magenta and magenta-red. The invention further provides a conversion characteristic that can be flexibly changed, and a device where no large-capacity memories are necessary.

According to the invention, there is provided a color conversion device for performing pixel-by-pixel color conversion of image data R, G and B of three colors, red, green and blue, comprising:

calculating means for calculating a maximum value β and a minimum value α of said image data for each pixel;

hue data calculating means for calculating hue data r, g, b, y, in and c based on said image data and said maximum and minimum values β and α outputted from said calculating means h;

means for generating comparison-result data based on each hue data outputted from said hue data calculating means;

arithmetic means for performing calculation using each hue data outputted from said hue data calculating means;

coefficient generating means for generating specified matrix coefficients; and a matrix calculator for performing matrix calculation based on the coefficients from said coefficient generating means, using the comparison-result data from said comparison-result data generating means, the output from said arithmetic means, the hue data from said hue data calculating means and said minimum value α from said calculating means, thereby to obtain color-converted image data.

With the above arrangement, it is possible to independently correct, in addition to the six hues of red, blue, green, yellow, cyan and magenta, the six inter-hue areas of red-yellow, yellow-green, green-cyan, cyan-blue, blue-magenta, and magenta-red.

It is also possible to flexibly change the conversion characteristics, and the large-capacity memory is not required.

It may be so arranged that said calculating means for calculating said maximum and minimum values β and α calculates a maximum value β and a minimum value α of the image data R, G and B, said hue data calculating means calculates hue data r, g, b, y, m and c by subtraction in accordance with:

$$r=R-\alpha,$$
$$g=G-\alpha,$$
$$b=B-\alpha,$$
$$y=\beta-B,$$
$$m=\beta-G,$$

and $$c=\beta-R;$$

based on inputted image data R, C and B and said maximum and minimum values β and α outputted from said calculating means, said comparison-result data generating means including multiplying means for multiplying respective due data by calculation coefficients aq1 to aq6 and ap1 to ap6; means for obtaining comparison-result data based on outputs from said multiplying means, said comparison-result data being hry=min (aq1*g, ap1*m), hrm=min (aq2*, ap2*y), hgy=min (aq3*r, ap3*c), hgc=min (aq4*b, ap4*y), hbm=min (aq5*r, ap5*c) and hbc=min (aq6*g, ap6*m), with min (A, B) indicating a minimum value of A and B; and means for obtaining comparison-result data based on comparison between each of said comparison-result data and each of said hue data;

said arithmetic means includes means for obtaining product terms and fraction terms based on each of said hue data, and the matrix calculator performs the matrix calculation using said comparison-result data from said comparison-result data generating means, said outputs from said arithmetic means, said hue data from said hue data calculating means and said minimum value α from said calculating means, to thereby obtain color-converted image data.

It may be so arranged that said calculating means for calculating said maximum and minimum values β and α includes means for obtaining complementary color data C, M and Y of cyan, magenta and yellow from image data R, G and B and calculating a maximum value β and a minimum value α of said complementary color data C, M and Y, said hue data calculating means determines complementary color data C, M and Y from image data R, G and B and calculating hue data r, g, b, y, m and c by subtraction in accordance with:

$$r=\beta-C,$$
$$g=\beta-M,$$
$$b=\beta-Y,$$
$$y=Y-\alpha,$$
$$m=M-\alpha,$$

and $$c=C-\alpha,$$

based on said complementary color data and said maximum and minimum values β and α, said comparison-result data generating means includes multiplying means for multiplying respective hue data by calculation coefficients aq1 to aq6 and ap1 to ap6; means for obtaining comparison-result data based on outputs from said multiplying means, said comparison-result data being hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m), with min (A, B) indicating a minimum value of A and B; and means for obtaining comparison-result data based on comparison between each of said comparison-result data and each of said hue data, said arithmetic means includes means for obtaining product terms and fraction terms based on each of said hue data, and said matrix calculator performs the matrix calculation using said comparison-result data from said comparison-result data generating means, said outputs from said arithmetic means, said hue data from said hue data calculating means and said minimum value α from said calculating means, to thereby obtain color-converted image data.

It may be so arranged that said calculating means for calculating said maximum and minimum values β and α calculates a maximum value β and a minimum value α of the image data R, G and B, said hue data calculating means calculates hue data r, g, b, y, m and c by subtraction in accordance with:

$$r=R-\alpha,$$
$$g=G-\alpha,$$
$$b=B-\alpha,$$
$$y=\beta-B,$$
$$m=\beta-G,$$

and $$c=\beta-R;$$

based on inputted image data R, G and B and said maximum and minimum values β and α outputted from said calculating means, said comparison-result data generating means includes
multiplying means for multiplying respective hue data by calculation coefficients aq1 to aq6 and aq1 to ap6;
means for obtaining comparison-result data based on outputs from said multiplying means, said comparison-result data being hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m), with min (A, B) indicating a minimum value of A and B;

means for obtaining comparison-result data based on comparison between each of said comparison-result data and each of said hue data, and means for obtaining comparison-result data between the hue data r, g, b and between the hue data y, m, c;

said arithmetic means includes means for obtaining product terms based on each of said hue data, and said matrix calculator performs the matrix calculation using said comparison-result data from said comparison-result data generating means, said outputs from said arithmetic means, said hue data from said hue data calculating means and said minimum value α from said calculating means, to thereby obtain color-converted image data.

It may be so arranged that said calculating means for calculating said maximum and minimum values β and α includes means for obtaining complementary color data C, M and Y
from image data R, C and B and calculating a maximum value β and α minimum value α of said complementary color data C, M and Y, said hue data calculating means determines complementary color data C, M and Y from image data R, G and B and calculating hue data r, g, b, y, m and c by subtraction in accordance with:

$$r=\beta-C,$$

$$g=\beta-M,$$

$$b=\beta-Y,$$

$$y=Y-\alpha,$$

$$m=M-\alpha,$$

and $$c=C-\alpha$$

based on said complementary color data and said maximum and minimum values β and α, said comparison-result data generating means includes multiplying means for multiplying respective hue data by calculation coefficients aq1 to aq6 and ap1 to ap6;

means for obtaining comparison-result data based on outputs from said multiplying means, said comparison-result data being hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m), with min (A, B) indicating a minimum value of A and B;

means for obtaining comparison-result data based on comparison between each of said comparison-result data and each of said hue data; and means for obtaining comparison-result data between the hue data r, g and b, and between the hue data y, m and c;

said arithmetic means includes means for obtaining product terms based on each of said hue data, and said matrix calculator performs the matrix calculation using said comparison-result data from said comparison-result data generating means, said outputs from said arithmetic means, said hue data from said hue data calculating means and said minimum value α from said calculating means, to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (1) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (1)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (2) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (2)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (3) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (3)$$

to thereby obtain color-converted image data.

With the above arrangement, by changing the coefficients of the product and fraction terms, and the first-order terms relating to the inter-hue areas, it is possible to adjust only the target hue or inter-hue area among the six hues or red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form or said comparison-result data and said hue data and said minimum value α outputted from said calculating means by a matrix calculation formula (4) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (4)$$

to thereby obtain color-converted image data.

With the above arrangement, by changing the coefficients or the product and fraction terms, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (5) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (5)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (6) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (6)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=to 19), said matrix calculator performs the matrix calculation on calculation terms in the form of said comparison-result data and said hue data and said minimum value α outputted from said calculating means by a matrix calculation formula (7) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (7)$$

to thereby obtain color-converted image data.

With the above arrangement, by changing the coefficients of the product and fraction terms, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (8) below:

$$\begin{bmatrix} C \\ M \\ Y \end{bmatrix} = (Eij)\begin{bmatrix} c \\ m \\ y \end{bmatrix} + (Fij)\begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \qquad (8)$$

to thereby obtain color-converted image data.

With the above arrangement, by changing the coefficients of the product and fraction terms, and the first-order terms relating to the inter-hue areas, it is possible to adjust only the target hue or inter-hue area among the six hues of red, blue, green, yellow, cyan and magenta, and the six inter-hue areas, without influencing other hues and inter-hue area, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (9) below:

$$\begin{bmatrix} R \\ G \\ B \end{bmatrix} = (Eij)\begin{bmatrix} r \\ g \\ b \end{bmatrix} + (Fij)\begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \qquad (9)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (10) below:

$$\begin{bmatrix} C \\ M \\ Y \end{bmatrix} = (Eij)\begin{bmatrix} c \\ m \\ y \end{bmatrix} + (Fij)\begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \qquad (10)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (11) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (11)$$

to thereby obtain color-converted image data.

With the above arrangement, by changing the coefficients of the product terms, the first-order terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (10) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (12)$$

to thereby obtain color-converted image data.

With the above arrangement, by changing the coefficients of the product terms, the first-order terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (13) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (13)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 18), said matrix calculator performs the matrix calculation on calculation terms in the form of said comparison-result data and said hue data and said minimum value α outputted from said calculating means by a matrix calculation formula (14) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (14)$$

to thereby obtain color-converted image data.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said hue data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (15) below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (15)$$

to thereby obtain color-converted image data.

With the above arrangement, by changing the coefficients of the product terms, the first-order terms in the form of comparison-result data based on the hue data, relating to specific hues, and the first-order terms relating to the inter-hue areas, it is possible to adjust only the target hue or inter-hue area among the six hues of red, blue, green, yellow, cyan arid magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said means for obtaining comparison-result data based on comparison between each of said comparison-result data and each of said hue data, in said comparison-result data generating means, determines comparison-result data based on comparison between said comparison-result data hry, hrm, hgy, hgc, hbm and hbc, and said time data r, g and b, said coefficient generating means generates specified matrix coefficients Eij (i=1 to 3, j=1 to 3) and Fij (i=1 to 3, j=1 to 19), said matrix calculator performs the matrix calculation on calculation terms in the form of said comparison-result data and said hue data and said minimum value α outputted from said calculating means by a matrix calculation formula (16) below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (16)$$

to thereby obtain color-converted image data.

With the above arrangement, by changing the coefficients of the product terms, the first-order terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said coefficient generating means generates specified matrix coefficients Eij (i=1 to 3, j=1 to 3) based on a formula (17) below:

$$(Eij) = \begin{bmatrix} 1 & 0 & 0 \\ 0 & 1 & 0 \\ 0 & 0 & 1 \end{bmatrix} \quad (17)$$

and the matrix coefficients Fij (i=1 to 3, j=1 to 18, or j=1 to 19) are generated such that, of the coefficients Fij, the coefficients for said product term based on each hue data outputted from said calculating means are set to zero, and other coefficients are set to specified values.

It may be so arranged that said multiplying means for multiplying said hue data by specified calculation coefficients aq1 to aq6 and aq1 to ap6, in said comparison-result data generating means, performs calculation on said hue data and said calculation coefficients by setting said calculation coefficients aq1 to aq6 and ap1 to ap6 to integral values of $2^n$, with n being an integer, and by bit shifting.

It may be so arranged that said calculating means for calculating a maximum value β and a maximum value α of said image data calculates a maximum value β and a minimum value α using said image data, and generating an identification code indicating the hue data which is of a value zero according to the image data or the complementary color data which are the largest and the smallest, and based on the identification code outputted from said calculation means, comparison-result data is generated by said comparison-result data generating means, and matrix coefficients are generated by said coefficient generating means, and matrix calculation is performed based on the coefficients from said coefficient generating means according to said identification code from said calculating means, to thereby obtain color-converted image data, or complementary color data.

According to another aspect of the invention, there is provided a color conversion method for performing pixel-by-pixel conversion of image data R, G and B of three colors, red, green and blue, comprising the steps of:

calculating a maximum value β and a minimum value α for each pixel of said image data;

calculating hue data r, g, b, y, m and c based on said image data and said maximum and minimum values β and α, and generating comparison-result data based on each of said calculated hue data;

performing calculation using each or said calculated hue data; and performing matrix calculation using said comparison-result data, said calculation output, said hue data and said minimum value α and based on specified matrix coefficients, to thereby obtain color-converted image data.

With the above arrangement, it is possible to independently correct, in addition to the six hues of red, blue, green, yellow, cyan and magenta, the six inter-hue areas of red-yellow, yellow-green, green-cyan, cyan-blue, blue-magenta, and magenta-red.

It is also possible to flexibly change the conversion characteristics, and the large-capacity memory is not required.

It may be so arranged that the method comprises the steps of:

calculating a maximum value β and a minimum value for said image data R, G and B;

calculating hue data r, g, b, y, m and c based on subtraction in accordance with:

$r=R-\alpha,$ $g=G-\alpha,$ $b=B-\alpha,$ $y=\beta-B,$ $m=\beta-G,$ and $c=\beta-R$ on said inputted image data R, G and B and said maximum and minimum values β and α;

multiplying said hue data by specified calculation coefficients aq1 to aq6 and aq1 to ap6, obtaining comparison-result data hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m) (where min (A, B) indicates the minimum value of A and B) using multiplied output and obtaining comparison-result data between said comparison-result data and said hue data;

obtaining product terms and fraction terms based on each of said hue data; and performing matrix calculation using said comparison-result data, the calculation output, said hue data and said minimum value α, to thereby obtain color-converted image data.

It may be so arranged that the method comprises the steps of:

calculating a maximum value β and a minimum value α of complementary color data C, M and Y of cyan, magenta and yellow from said image data R, C and B;

calculating hue data r, g, b, y, m and c based on subtraction in accordance with:

$r=\beta-C,$ $g=\beta-M,$ $b=\beta-Y,$ $y=Y-\alpha,$ $m=M-\alpha,$ and $c=C-\alpha$ on said complementary color data C, M and Y and said maximum and minimum values β and α;

using outputted results of multiplying said hue data by specified calculation coefficients aq1 to aq6 and aq1 to ap6, to obtain comparison-result data hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m) (where min (A, B) indicates the minimum value of A and B), and obtaining comparison-result data between said comparison-result data and said hue data;

obtaining product terms and fraction terms for each line data; and performing matrix calculation using said comparison-result data, said calculation outputs, said hue data and said minimum value α, to thereby obtain color-converted complementary color data.

It may be so arranged that the method comprises the steps of:

calculating a maximum value β and a minimum value for said image data R, C and B;

calculating hue data r, g, b, y, in and c based on subtraction in accordance with:

$r=R-\alpha,$ $g=C-\alpha,$ $b=B-\alpha,$ $y=\beta-B,$ $m=\beta-G,$ and $c=\beta-R$ on said
image data R, G and B and said maximum and minimum values β and α;

multiplying said hue data by specified calculation coefficients aq1 to aq6 and ap1 to ap6, obtaining comparison-result data hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m) (where min (A, B) indicates the minimum value of A and B) using multiplied output, obtaining comparison-result data between said comparison-result data and said hue data;

obtaining comparison-result data between the hue data r, g, b and between the hue data y, m, c;

obtaining product terms based on each or said hue data; and performing matrix calculation using said comparison-result data, the calculation output, said hue data and said minimum value α, to thereby obtain color-converted image data.

It may be so arranged that the method comprises the steps of:

obtaining complementary color data C, M and Y from said image data R, G and B, and calculating a maximum value β and a minimum value α of said complementary color data;

obtaining complementary color data from said image data R, G and B;

calculating hue data r, g, b, y, m and c based on subtraction in accordance with:

$r=\beta-C,$ $g=\beta-M,$ $b=\beta-Y,$ $y=Y-\alpha,$ $m=M-\alpha,$ and $c=C-\alpha$ on said complementary color data and said maximum and minimum values β and α;

multiplying said hue data by specified calculation coefficients aq1 to aq6 and ap1 to ap6;

using outputs of said multiplication to obtain comparison-result data hry=min (aq1*g, ap1*m), hrm=min (aq2*b, ap2*y), hgy=min (aq3*r, ap3*c), hgc=min (aq4*b, ap4*y), hbm=min (aq5*r, ap5*c) and hbc=min (aq6*g, ap6*m) (where min (A, B) indicates the minimum value of A and B);

obtaining comparison-result data based on comparison between each said comparison-result data and said hue data;

obtaining comparison-result data based on comparison among said hue data r, g and b and among said hue data y, m and c;

obtaining a product term for each of said hue data; and performing matrix calculation by using said comparison-result data, said calculated outputs, said hue data and said minimum value α, and thereby obtaining color-converted complementary color data.

BRIEF DESCRIPTION OF THE DRAWINGS

In the accompanying drawings:

FIG. 3 is a table showing an example of the relationship between an identification code S1, and the maximum and minimum values β and α, and hue data whose value is zero, in the color conversion device of Embodiment 1;

FIG. 4 is a table showing the operation of a zero remover of the polynomial arithmetic unit in the color conversion device of Embodiment 1;

FIG. 10A and FIG. 10B are tables showing the relationship of effective calculation terms which relate to and are effective for each hue and an inter-hue area in the color conversion device of Embodiment 1;

FIG. 17A and FIG. 17B are tables showing the relationship between calculation terms which are effective for each hue and an inter-hue area in the color conversion device of Embodiment 5;

FIG. 20 is a block diagram showing part of an example of configuration of a matrix calculator included in the color conversion device of Embodiment 9;

FIG. 22A and FIG. 22B are tables showing the relationship between calculation terms which are effective for each hue and an inter-hue area in the color conversion device of Embodiment 9;

FIG. 28A and FIG. 28B are tables showing the relationship between calculation terms which are effective for each hue and an inter-hue area in the color conversion device of Embodiment 13;

DETAILED DESCRIPTION OF THE PREFERRED EMBODIMENTS

Next, the preferred embodiments of the present invention will be described in detail with reference to the accompanying drawings.

Embodiment 1

Figure 1:
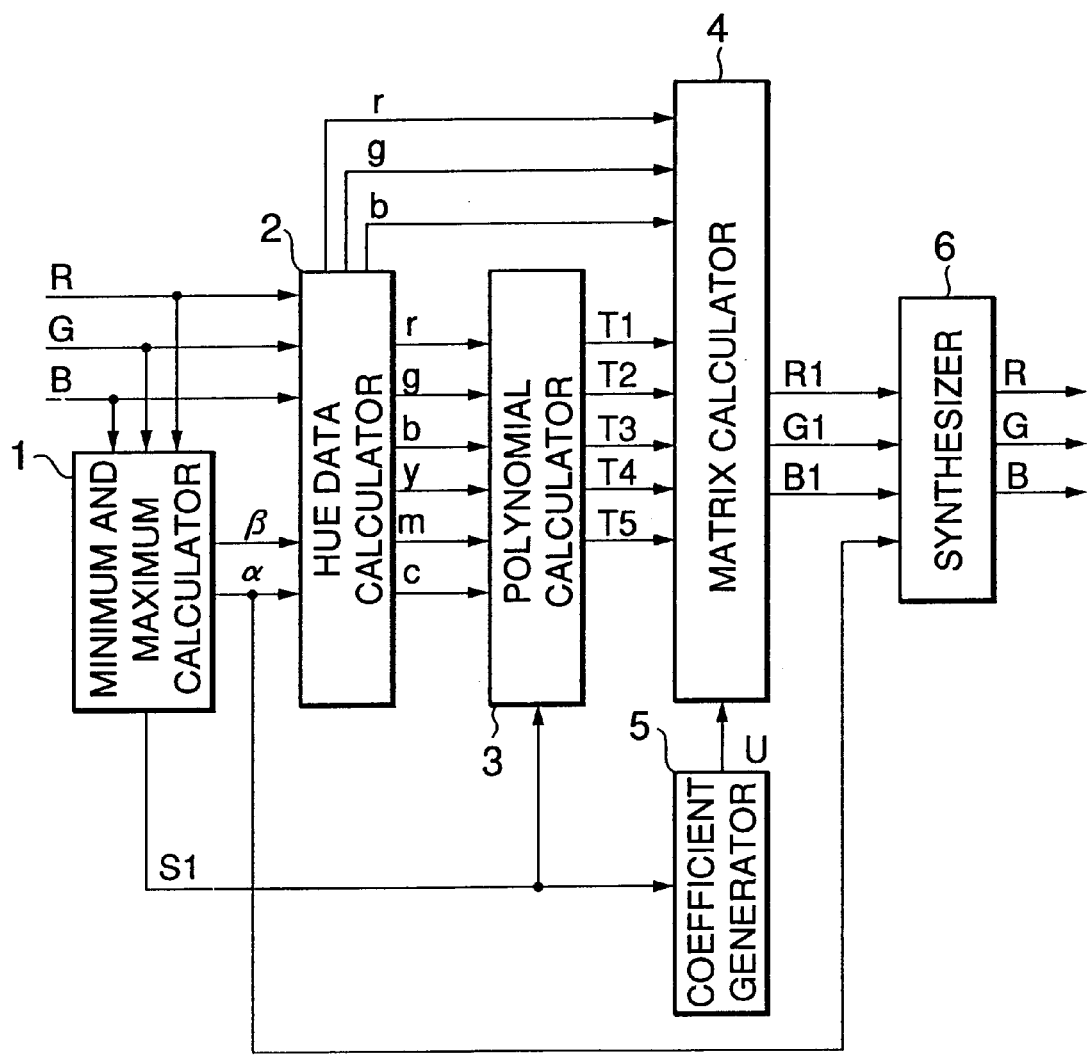
FIG. 1 is a block diagram showing an example of configuration of a color conversion device of Embodiment 1 of the present invention.

FIG. 1 is a block diagram showing an example of a configuration of a color conversion device of Embodiment 1 of the present invention. In the drawing, a reference numeral 1 denotes a minimum and maximum calculator for calculating a maximum value β and a minimum value α of the inputted image data R, G and B, and generating and outputting an identification code S1 for indicating, among the six hue data, data which are zero, as will be better understood from the following description; 2, a hue data calculator for calculating hue data 4, g, b, y, m and c from the image data R, G and B and the outputs from the minimum and maximum calculator; 3, a polynomial arithmetic unit; 4, a matrix calculator; 5, a coefficient generator; and 6, a synthesizer.

Figure 2:
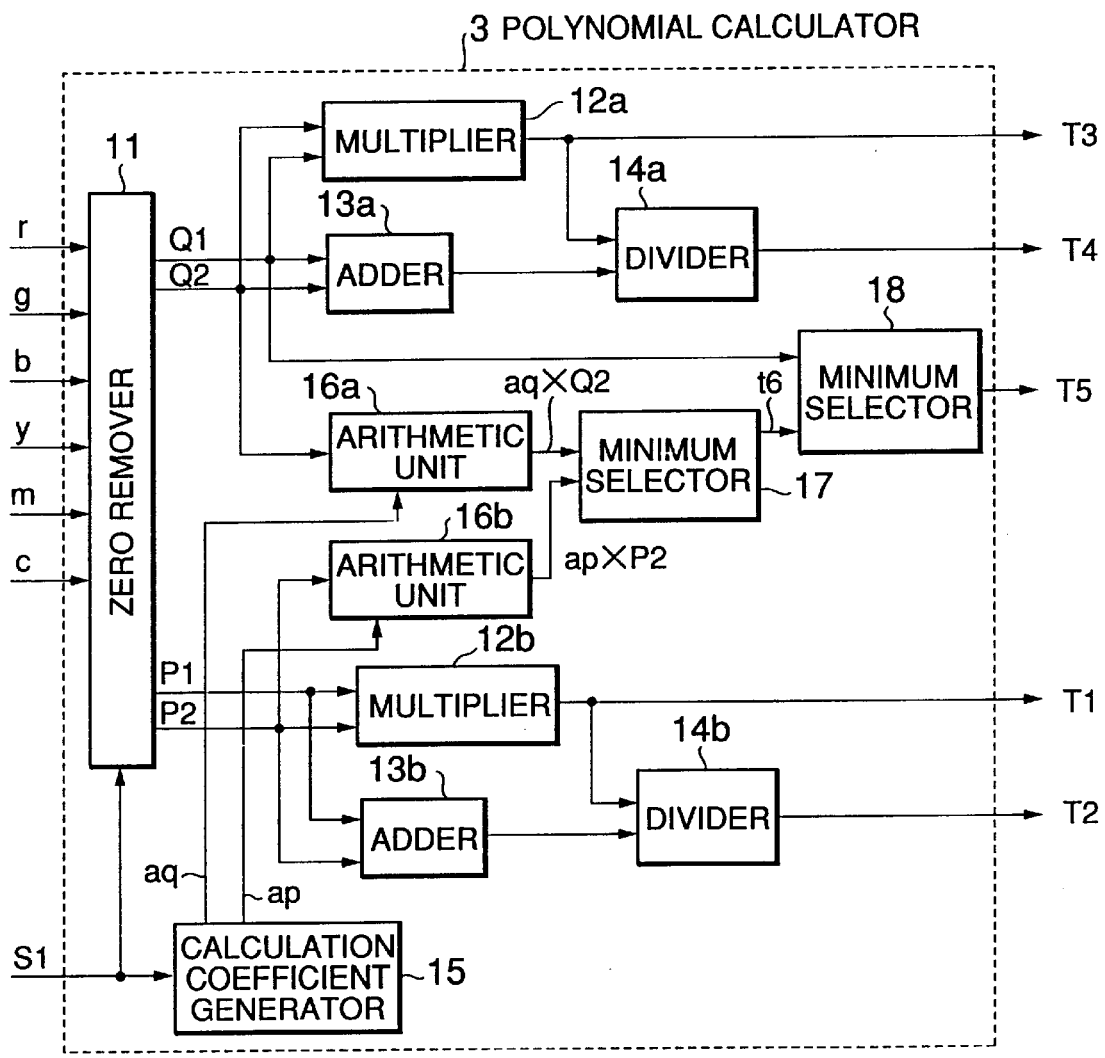
FIG. 2 is a block diagram showing an example of configuration of a polynomial arithmetic unit included in the color conversion device of Embodiment 1.

FIG. 2 is a block diagram showing an example of configuration of the polynomial arithmetic unit 3. In the drawing, a reference numeral 11 denotes a zero remover for removing, from the inputted hue data, data which is of value zero; 12a and 12b, multipliers; 13a and 13b, adders; 14a and 14b, dividers; and 15, a calculation coefficient generator for generating and outputting calculation coefficients based on the identification code from the minimum and maximum calculator 1. Reference numerals 16a and 16b denote arithmetic units for performing multiplication between the calculation coefficients outputted from the calculation coefficient generator 15 and the inputted data; and 17 and 18, minimum selectors for selecting and outputting the minimum value of the inputted data.

Thus, in the foregoing minimum and maximum calculator 1, identification code S1 for indicating, among the six hue data, data which are zero are generated and outputted. The identification code S1 can assume one of the six values, depending on which of Ri, Gi and Bi are of the maximum and minimum values β and α. FIG. 3 shows a relationship between the values of the identification code S1 and the maximum and minimum values β and α of Ri, Gi and Bi and hue data which has a value zero. In the drawing, the values of the identification code S1 represent just an example, and the values may be other than those shown therein.

The maximum and minimum values β and α calculated by the minimum and maximum calculator 1 are respectively represented as follows: β=MAX (Ri, Ci, Bi), and α=MIN (Ri, Gi, Bi). Since the six hue data r, g, b, y, m and c calculated by the hue data calculator 2 are obtained by the subtraction of r=Ri−α, g Gi−α, b=Bi−α, y=β−Bi, m=β−Gi and c=β−Ri, there is a characteristic that at least two among these six hue data are of a value zero. For example, if a maximum value β is Ri and a minimum value α is Gi (β=Ri, and α=Gi), g=0 and c=0. If a maximum value β is Ri and a minimum value α is Bi (β=Ri, and α=Bi), b=0 and c=0. In other words, in accordance with a combination of Ri, Gi and Bi which are the largest and the smallest, respectively, one of r, g and b, and one of y, m and c, i.e., in total two of them have a value zero.

Thus, in the foregoing minimum and maximum calculator 1, identification code S1 for indicating, among the six hue data, data which are zero are generated and outputted. The identification code S1 can assume one of the six values, depending on which of Ri, Gi and Bi are of the maximum and minimum values β and α. FIG. 3 shows a relationship between the values of the identification code S1 and the maximum and minimum values β and α of Ri, Gi and Bi and hue data which has a value zero. In the drawing, the values of the identification code S1 represent just an example, and the values may be other than those shown in.

Then, the six hue data r, g, b, y, m and c outputted from the hue data calculator 2 are sent to the polynomial arithmetic unit 3, and the hue data r, g and b are also sent to the matrix calculator 4. The polynomial arithmetic unit 3 also receives the identification code S1 outputted from the minimum and maximum calculator 1, and performs calculation by selecting, from the hue data, two data Q1 and Q2 which are not zero, and from the hue data y, m and c, two data P1 and P2 which are not of a value zero. Next, this operation will be described by referring to FIG. 2.

The hue data from the hue data calculator 2 and the identification code S1 from the minimum and maximum calculator 1 are inputted to the zero remover 11 in the polynomial arithmetic unit 3. The zero remover 11 outputs, based on the identification code S1, the two data Q1 and Q2 which are not of a value zero, among the hue data r, g and b and the two data P1 and P2 which are not of a value zero, among the hue data y, m and c. Here, the data Q1, Q2, P1 and P2 outputted from the zero remover 11 are the hue data excluding data which are of a value zero, and satisfy the relationships Q1≧Q2 and P1≧P2. In other words, Q1, Q2, P1 and P2 are determined as shown in FIG. 4, and then outputted. For example, In FIG. 3 and FIG. 4, if an identification code S1 is of a value zero, Q1 and Q2 are obtained from the hue data r and b, and P1 and P2 are obtained from the hue data y and m, and since the maximum value β is Ri and the minimum value α is Gi, r (=β−α)≧b (=Bi−α) and m (=β−α)≧y (β−Bi), so the outputs are given by Q1=r, Q2=b, P1=m and P2=y. As in the case of FIG. 3, the values of identification code S1 in FIG. 4 represent just an example, and may be other than those shown in FIG. 4.

The data Q1 and Q2 outputted from the zero remover 11 are inputted to the multiplier 12a, which calculates and outputs the product T3=Q1*Q2. The data P1 and P2 outputted from the zero remover 11 are inputted to the multiplier 12b, which calculates and outputs the product T1=P1*P2. The adders 13a and 13b respectively output the sums Q1+Q2 and P1+P2. The divider 14a receives T3 from the multiplier 12a and Q1+Q2 from the adder 13a, and outputs a quotient T4=T3/(Q1+Q2). The divider 14b receives T1 from the multiplier 12b and P1+P2 from the adder 13b, and outputs a quotient T2=T1/(P1+P2).

The identification code S1 is inputted from the minimum and maximum calculator 1 to the calculation coefficient generator 15, which generates signals indicating calculation coefficients aq and ap based on the identification code S1, and the calculation coefficients aq are supplied to the arithmetic unit 16a, and the coefficients ap are outputted to the arithmetic unit 16b. These calculation coefficients aq and ap corresponding to the respective hue data Q2 and P2 are generated based on the identification code S1, and each of the calculation coefficients aq and ap can assume one of the six values, corresponding to the value of the identification code S1, as shown in FIG. 4. The arithmetic unit 16a receives the data Q2 from the zero remover 11, performs multiplication of aq*Q2, with aq being the calculation coefficient from the calculation coefficient generator 15, and sends the result to the minimum selector 17. The arithmetic unit 16b receives the data P2 from the zero remover 11, performs multiplication of ap* P2, with ap being the calculation coefficient from the calculation coefficient generator 15, and sends the result to the minimum selector 17.

The minimum selector 17 selects the minimum value t6=min aq*Q2, ap*P2) of the outputs of the arithmetic units 16a and 16b, and outputs these minimum value to the minimum selector 18. The data Q1 outputted from the zero remover 11 is also inputted to the minimum selector 18. The minimum selector 18 thus outputs the minimum value T5=min (Q1, min (aq*Q2, ap*P2) of Q1 and t6=min (aq*Q2, ap*P2). The foregoing polynomial data T1, T2, T3, T4 and T5 are outputs from the polynomial arithmetic units 3. The outputs of this polynomial arithmetic unit 3 are sent to the matrix calculator 4.

The coefficient generator 5 shown in FIG. 1 generates calculation coefficients U (Fij) and fixed coefficients U (Eij) for the polynomial data based on the identification code S1, and sends the same to the matrix calculator 4. The matrix calculator 4 receives the hue data r, g and b from the hue data calculator 2, the polynomial data T1 to T5 from the polynomial arithmetic unit 3 and the coefficients U from the coefficient generator 5, and outputs the results of calculation according to the following formula (19) as image data R1, C1 and B1.

$$\begin{bmatrix} R1 \\ G1 \\ B1 \end{bmatrix} = (Eij) \begin{bmatrix} r \\ g \\ b \end{bmatrix} + (Fij) \begin{bmatrix} T1 \\ T2 \\ T3 \\ T4 \\ T5 \end{bmatrix} \quad (19)$$

For (Eij), i=1 to 3 and j=1 to 3, and for (Fij), i=1 to 3 and j=1 to 5.

Figure 5:
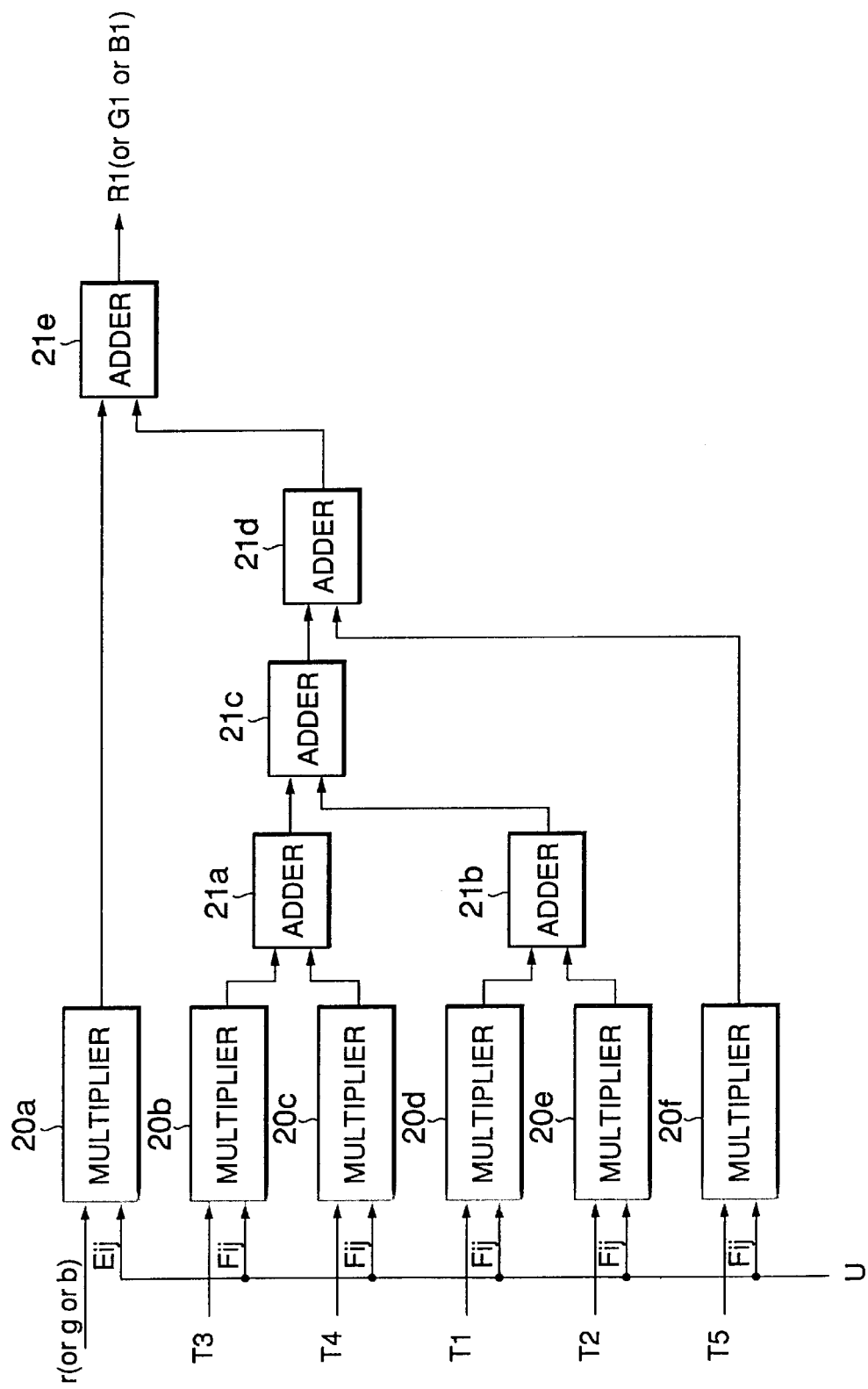
FIG. 5 is a block diagram showing an example of configuration of a matrix calculator included in the color conversion device of Embodiment 1.
Figure 6A:
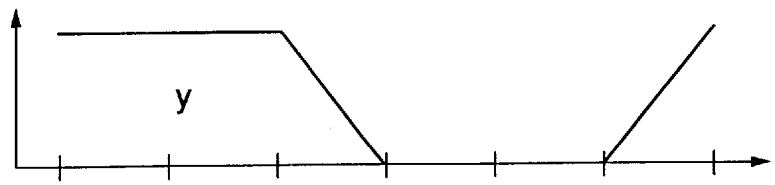
FIG. 6A to FIG. 6F are diagrams schematically showing the relationship between six hues and hue data.
Figure 6B:
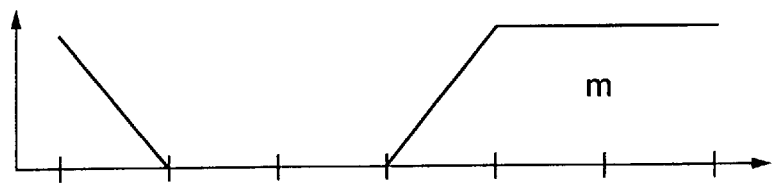
Figure 6C:
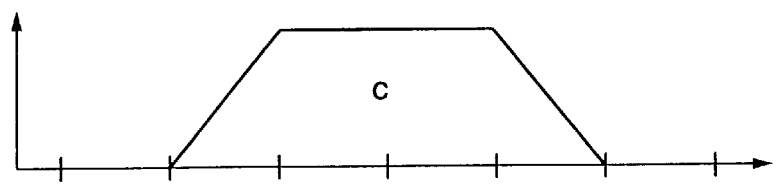
Figure 6D:
Figure 6E:
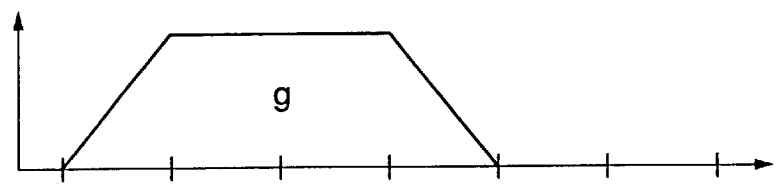
Figure 6F:
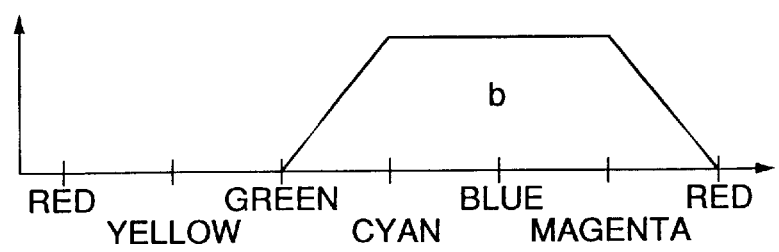
Figure 7A:
FIG. 7A to FIG. 7F are diagrams schematically showing the relationship between a product term and hues in the color conversion device or Embodiment 1.
Figure 7B:
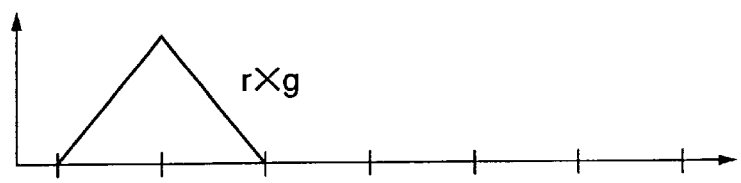
Figure 7C:
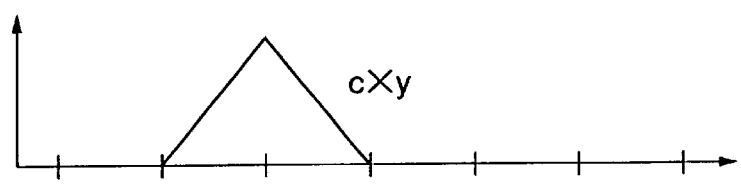
Figure 7D:
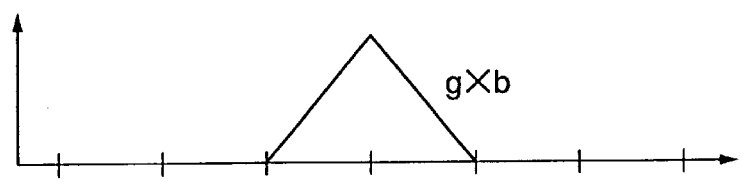
Figure 7E:
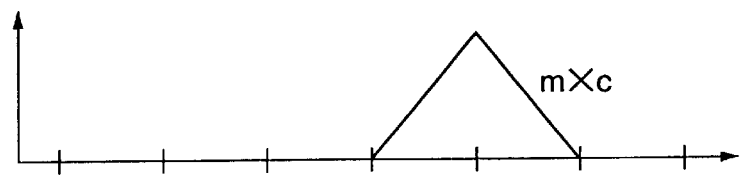
Figure 7F:
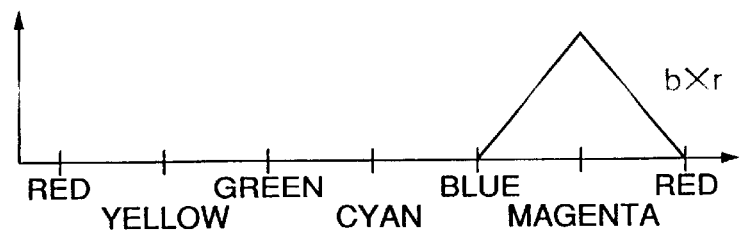
Figure 8A:
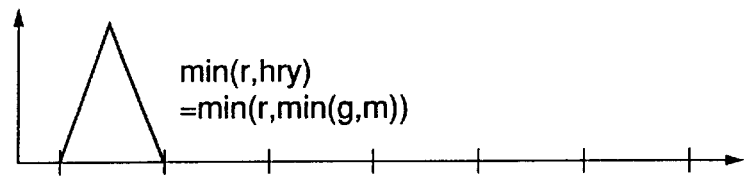
FIG. 8A to FIG. 8F are diagrams schematically showing the relationship between a calculation term in the form of comparison-result data and hues in the color conversion device of Embodiment 1.
Figure 8B:
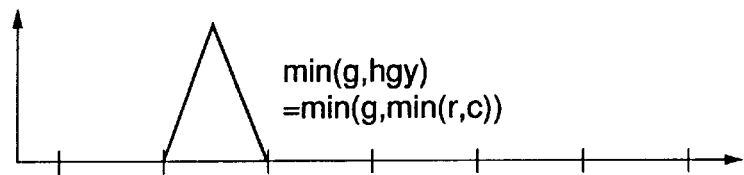
Figure 8C:
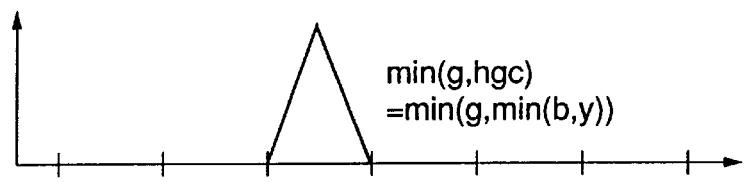
Figure 8D:
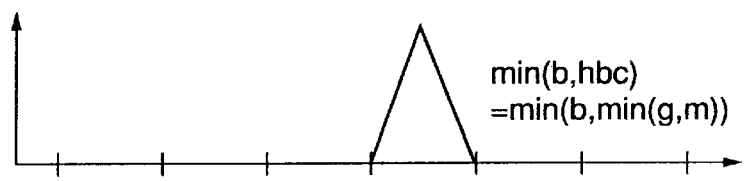
Figure 8E:
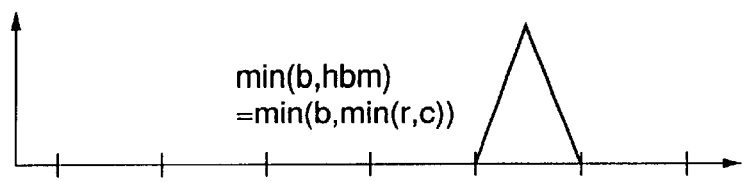
Figure 8F:
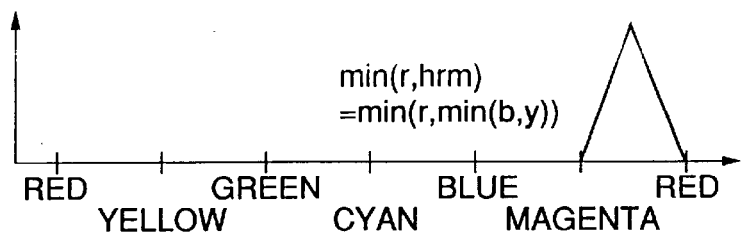
Figure 9A:
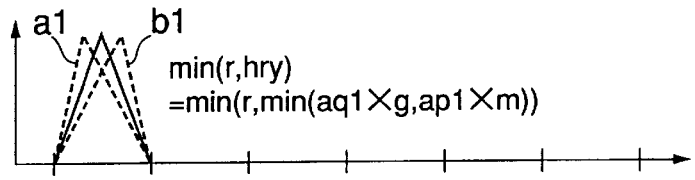
FIG. 9A to FIG. 9F are diagrams schematically showing the relationship between a calculation term in the form of comparison-result data and hues when a calculation coefficient is changed in a calculation coefficient generator 15 of the polynomial arithmetic unit in the color conversion device of Embodiment 1.
Figure 9B:
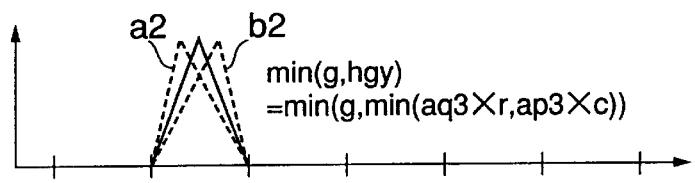
Figure 9C:
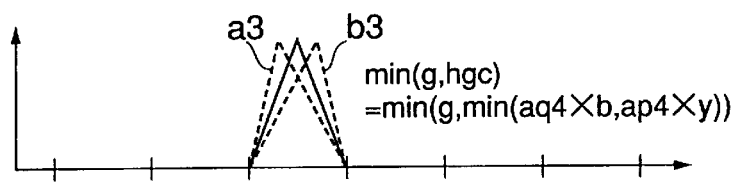
Figure 9D:
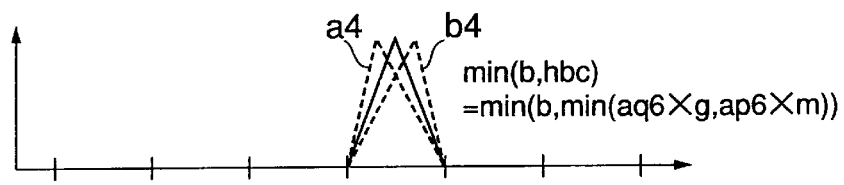
Figure 9E:
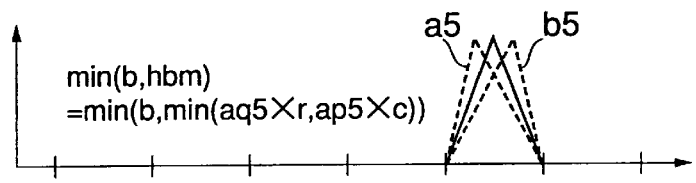
Figure 9F:
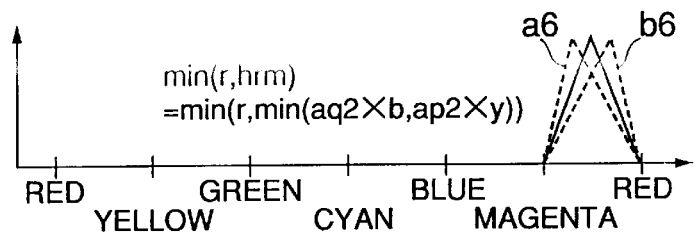

FIG. 5, which is a block diagram, shows an example of configuration of part of the matrix calculator 4. Specifically, it shows how R1 is calculated and outputted. In the drawing, reference numerals 20a to 20f denote multipliers; 21a to 21e, adders.

Next, the operation of the matrix calculator 4 of FIG. 5 will be described. The multipliers 20a to 20f receives the hue data r, the polynomial data T1 to T5 from the polynomial arithmetic unit 3 and the coefficients U (Eij) and U (Fij) from the coefficient generator 5, and then output the products thereof. The adders 21a and 21b receive the products outputted from the multipliers 20b to 20e, add the inputted data and outputs the sums thereof. The adder 21c adds the data from the adders 21a and 21b, and the adder 21d adds the output from the adder 21c and the product outputted from the multiplier 20f. The adder 21e adds the output from the adder 21d and the output from the multiplier 20a, and outputs the sum total thereof as image data R1. In the example of configuration shown in FIG. 5, if the hue data r is replaced by the hue data g or b, image data G1 or B1 can be calculated.

The part of the coefficients (Eij) and (Fij) corresponding to the hue data r, g and b are used. In other words, if three configuration, each similar to that of FIG. 5, are used in parallel for the hue data r, g and b, matrix calculation can be performed at a higher speed.

The synthesizer 6 receives the image data R1, G1 and B1 from the matrix calculator 4 and the minimum value α outputted from the minimum and maximum calculator 1 representing the achromatic data, performs addition, and outputs image data R, C and B. The equation used for obtaining the image data color-converted by the color-conversion method of FIG. 1 is therefore given by the following formula (1).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (1)$$

Here, for (Eij), i1 to 3 and j=1 to 3, and for (Fij), i=1 to 3 and j=1 to 18, and hry=min (aq1*g, ap1*m),
hrm=min (aq2*b, ap2*y),
hgy=min (aq3*r, ap3*c),
hgc=min (aq4*b, ap4*y),
hbm=min (aq5*r, ap5*c), and
hbc=min (aq6*g, ap6*m), and aq1 to aq6 and aq1 to ap6 indicate calculation coefficients generated by the calculation coefficient generator 15 of FIG. 2.

The difference between the number of calculation terms in the formula (1) and the number of calculation terms in FIG. 1 is that FIG. 1 shows a method of calculation for each pixel excluding data resulting in the calculation terms which are of a value zero, while the formula (1) represents a general formula for a set of pixels. In other words, eighteen polynomial data for one pixel of the formula (1) can be reduced to five effective data, and this reduction is achieved by exploiting a characteristic of the hue data.

The combination of effective data is changed according to image data of the target pixel. For all image data, all the polynomial data can be effective.

FIG. 6A to FIG. 6F schematically show relations between the six hues and the hue data y, in, c, r, g and b. Each hue data relates to three hues.

FIG. 7A to FIG. 7F schematically show relations between the six hues and the product terms y*m, r*g, c*y, g* b, m*c and b*r, and it can be understood that each product term is a second-order term for a specified hue. For example, if W is a constant, since r=W and g=b=0 hold for red, y=m=W and c=0 are obtained. Accordingly, y*m=W*W is realized, and the other five terms are all zero. In other words, only y*m is an effective second-order term for red. Similarly, c*y is the only effective term for green; m*c for blue; g*b for cyan; b*r for magenta; and r*g for yellow.

Each of the foregoing formulae (19) and (1) includes a first-order fraction term effective only for one hue. Those fraction terms are: r*g/(r+g), g*b/(g+b), b*r/(b+r), y*m/(y+m), m*c/(m+c), and c*y/(c+y), and there are thus six such fraction terms. These have first-order term characteristics. For example, if W is a constant, since r=W and g=b=0 hold for red, y=m=W and c=0 are obtained. Then, y*m/(y+m)=W/2, and the other five terms are all zero. Accordingly, only y*m/(y+m) is an effective first-order term for red. Similarly, c*y/(c+y) is an only effective first-order term for green; m*c/(m+c) for blue; g*b/(g+b) for cyan; b*r/(g+r) for magenta; and r*g/(r+g) for yellow. Here, if a numerator and a denominator are both zero, then a first-order term should be set to zero.

Next, a difference between the first-order and second-order terms will be described. As described above, for red, if W is a constant, y*m=W*W is realized, and the other product terms are all zero. Here, since the constant W indicates the magnitudes of the hue signals y and m, the magnitude of the constant W depends on the color brightness or chroma. With y*m=W*W, the product term y*m is a second-order function for chroma. The other product terms are also second-order functions For chroma regarding the hues to which these terms are effective. Accordingly, influence given by each product term to color reproduction is increased in a second-order manner as chroma is increased. In other words, the product term is a second-order term which serves as a second-order correction term for chroma in color reproduction.

On the other hand, for red, if W is a constant, y*m/(y+m)=W/2 is realized, and the other fraction terms are all zero. Here, the magnitude of the constant W depends of color brightness or chroma. With y*m/(y+m)=W/2, the fraction term y+m/(y+m) is a first-order function for chroma. The other fraction terms are also first-order functions for chroma regarding the hues to which these terms are effective. Accordingly, the influence given by each fraction term to color reproduction is a first-order function for chroma, in other words, the fraction term is a first-order term which serves as a first-order correction term for chroma in color reproduction.

FIG. 8A to FIG. 8F schematically show relations between the six hues and first-order calculation terms in the form of comparison-result data, min (r, hry), min (g, hgy), min (g, hgc), min (b, hbc), min (b, hbm) and min (r, hrm). It is assumed that the values of calculation coefficients aq1 to aq6 and ap1 to ap6, in hry=min (aq1*g, ap1*m),
hrm=min (aq2*b, ap2*y),
hgy=min (aq3*r, ap3*c),
hgc=min (aq4*b, ap4*y),
hbm=min (aq5*r, ap5*c) and
hbc=min (aq6*g, ap6*m), in the foregoing formulae (19) and (1) are set to "1". It can be understood from FIG. 8A to FIG. 8F, that the first-order calculation terms in the form of the comparison-result data relate to changes in the six inter-hue areas of red-green, yellow-green, green-cyan, cyan-blue, blue-magenta, and magenta-red. In other words, b=c=0 holds for red-yellow, and the five terms other than min (r, hry)=min (r, min (g, m)) are all zero. Accordingly, only min (r, hry)=min (r, min (g, m)) is an effective first-order calculation term. Similarly, only min (g, hgy) is an effective first-order calculation term for yellow-green; min (g, hgc) for green-cyan; min (b, hbc) for cyan-blue; min (b, hbc) for blue-magenta; and min (r, hrm) for magenta-red.

FIG. 9A to FIG. 9F schematically show relations between the six hues and the first-order calculation terms in the form of comparison-result data when the calculation coefficients aq1 to aq6 and ap1 to ap6 are changed in hry, hrm, hgy, hgc, hbm and hbc in the foregoing formulae (19) and (1). The broken lines a1 to a6 shows the characteristics when aq1 to aq6 assume values larger than aq1 to ap6. The broken lines b1 to b6 shows the characteristics when ap1 to ap6 assume values larger than aq1 to aq6.

Specifically, for red to yellow, only min (r, hry)=min (r, min (aq1*g, ap1*m) ) is an effective first-order calculation term. If, for example, the ratio between aq1 and ap1 is 2:1, the peak value of the calculation term is shifted toward red, as indicated by the broken line a1 in FIG. 9A, and thus it can be made an effective calculation term for an area closer to red in the inter-hue area of red-yellow. On the other hand, for example if the ratio between aq1 and aq1 is 1:2, the relationship is like that indicated by the broken line b1 in FIG. 9A, the peak value of the calculation term is shifted toward yellow, and thus it can be made an effective calculation term for an area closer to yellow in the inter-hue area of red to yellow. Similarly, by respectively changing:

aq3 and ap3 in min (g, hgy) for yellow to green,
aq4 and ap4 in min (g, hgc) for green to cyan,
aq6 and ap6 in min (b, hbc) for cyan to blue,
aq5 and ap5 in min (h, hbm) for or blue to magenta and
aq2 and ap2 in min (r, hrm) for magenta to red, in the inter-hue areas between adjacent ones of these hues, effective areas can be changed.

FIG. 10A to FIG. 10B respectively show relations between the six hues and inter-hue areas and effective calculation terms. Thus, if the coefficient generator 5 changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial arithmetic unit 3 are changed, part of the inter-hue area where a calculation term in the inter-hue area is effective can be changed without giving any influence to the other hues.

Next, an example of coefficients generated by the coefficient generator 5 of Embodiment 1 described above with reference to FIG. 1 will be described. The following formula (17) shows an example of coefficients U (Eij) generated by the coefficient generator 5.

$$(Eij) = \begin{bmatrix} 1 & 0 & 0 \\ 0 & 1 & 0 \\ 0 & 0 & 1 \end{bmatrix} \quad (17)$$

If the coefficients U (Eij) in the foregoing formula are all zero this represents the case where no color conversion is executed. The following formula (18) shows the case where, of the coefficients U (Fij), the coefficients for second-order calculation terms which are product terms are all zero, and coefficients for fraction terms and calculation terms in the form of comparison-result data, both of which are first-order calculation terms, are represented by, for example Ar1 to Ar3, Ay1 to Ay3, Ag1 to Ag3, Ac1 to Ac3, Ab1 to Ab3, Am1 to Am3, Ary1 to Ary3, Agy1 to Agy3, Agc1 to Agc3, Abc1 to Abc3, Abm1 to Abm3 and Arm1 to Arm3.

$$(Fij) = \begin{bmatrix} 0 & 0 & 0 & 0 & 0 & 0 & Ab1 & Ar1 & Ag1 & Ay1 & Ac1 & Am1 & Ary1 & Arm1 & Agy1 & Agc1 & Abm1 & Abc1 \\ 0 & 0 & 0 & 0 & 0 & 0 & Ab2 & Ar2 & Ag2 & Ay2 & Ac2 & Am2 & Ary2 & Arm2 & Agy2 & Agc2 & Abm2 & Abc2 \\ 0 & 0 & 0 & 0 & 0 & 0 & Ab3 & Ar3 & Ag3 & Ay3 & Ac3 & Am3 & Ary3 & Arm3 & Agy3 & Agc3 & Abm3 & Abc3 \end{bmatrix} \quad (18)$$

In the foregoing, correction is performed by using the fraction terms and the calculation terms in the form of the comparison-result data, both of which are first-order calculation terms. Accordingly, only a hue or an inter-hue area can be linearly adjusted and, if coefficients relating to a first-order calculation term for a hue or an inter-hue area to be adjusted are set to be values other than zero and the other coefficients are made to be zero, only the target hue or inter-hue area can be adjusted. For example, if coefficients Ar1 to Ar3 relating to m*y/(m+y) relating to red are set, the red hue is changed, and to vary the proportion between red and yellow, the coefficients Ary1 to Ary3 relating to min (r, hry) are used.

Furthermore, if, in the polynomial arithmetic unit 3, the values of calculation coefficients aq1 to aq6 and ap1 to ap6 in hry=min (aq1*g, ap1*m)
hrm=min (aq2*b, ap2*y),
hgy=min (aq3*r, ap3*c),
hgc=min (aq4*b, ap4*y),
hbm=min (aq5*r, ap5*c) and
hbc=min (aq6*g, ap6*m)

are changed so as to assume integral values of 1, 2, 4, 8, . . . , i.e., $2^n$ (where n is an integer), multiplication can be achieved in the arithmetic units 16a and 16b by bit shifting.

As apparent from the foregoing, by changing the coefficients of the product and fraction terms relating to specific hues, the coefficients U (Fij) can be independently corrected, and thus the six inter-hue areas can also be corrected. Each of the foregoing product terms is a second-order calculation for chroma, and each of the fraction terms is a first-order calculation for chroma. Accordingly, by using both of the product term and the fraction term, the non-linearity of an image-printing or the like can be corrected for chroma.

Provided therefore is a color conversion device or a color conversion method, which is capable of flexibly changing a conversion characteristic and eliminates the necessity of a large-capacity memory.

In Embodiment 1 described above, the hue data r, g and b, y, m and c, and the maximum and minimum values β and α were calculated based on the inputted image data R, G and B so as to obtain the calculation terms for the respective hues, and after the matrix calculation, the image data R, G and B were obtained. However, after the outputted image data are obtained, the data R, G and B may be converted into complementary color data C, M and Y. In this case, the same effects will be realized.

Furthermore, in Embodiment 1 described above, the processing was performed by the hardware configuration of FIG. 1. Needless to say, the same processing can be performed by software in the color conversion device, and in this case, the same effects as those of Embodiment 1 will be provided.

Embodiment 2

In Embodiment 1, the hue data r, g and b, y, m and c, and the maximum and minimum values β and α were calculated based on the inputted image data R, G and B so as to obtain the calculation terms for the respective hues, and after the matrix calculation, the image data R, G and B were obtained. But the image data R, G and B may first be converted into complementary color data C, M and Y, and then color conversion may be executed by inputting the complementary color data C, M and Y.

Figure 11:
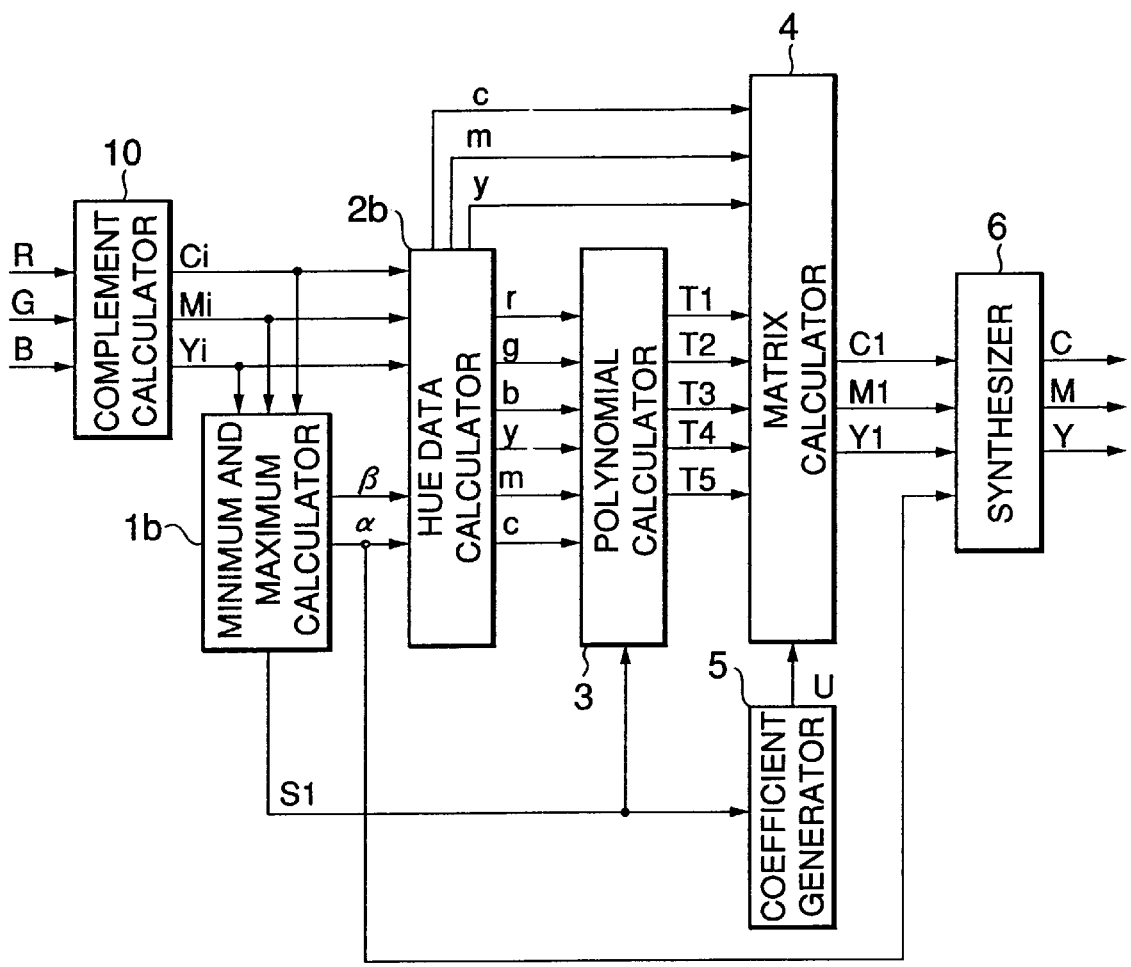
FIG. 11 is a block diagram showing an example of configuration of a color conversion device of Embodiment 2 of the present invention.

FIG. 11 is a block diagram showing an example of configuration of a color conversion device and a color conversion method of Embodiment 2 of the present invention. In the drawing, reference numerals 3 to 6 denote the same embers as those described with reference to FIG. 1 in connection with Embodiment 1. Reference numeral 10 denotes a complement calculator; 1b, a minimum and maximum calculator for generating maximum and minimum values β and α of complementary color data and an identification code for indicating, among the six hue data, data which are zero; and 2b, a hue data calculator for calculating hue data r, g, b, y, m and c based on complementary color data C, M and Y from the complement calculator 10 and outputs from the minimum and maximum calculator 1b.

Next, the operation will be described. The complement calculator 10 receives the image data R, G and B, and outputs complementary color data Ci, Mi and Yi obtained by determining 1's complements. The minimum and maximum calculator 1b outputs the maximum and minimum values β and α of each or these complementary color data and an identification code S1 for indicating, among the six hue data, data which are zero.

Then, the hue data calculator 2b receives the the complementary color data Ci, Mi and Yi and the maximum and minimum values β and α from the minimum and maximum calculator 1b, performs subtraction of r=β−Ci, g=β−Mi, b=β−Yi, y=Yi−α, m=Mi−α, and c=Ci−α, and outputs six hue data r, g, b, y, m and c. Here, at least two among these six hue data are zero. The identification code S1 outputted from the minimum and maximum calculator 1b is used for specifying, among the six hue data, data which is zero. The value of the identification code depends on which of Ci, Mi and Yi the maximum and minimum values β and α are. Relations between the data among the six hue data which are zero, and the values of the identification code are the same as those in Embodiment 1, and thus further explanation will be omitted.

Then, the six hue data r, g, b, y, in and c outputted from the hue data calculator 2b are sent to the polynomial arithmetic unit 3, and the hue data c, m and y are also sent to the matrix calculator 4. The polynomial arithmetic unit 3 also receives the identification code S1 outputted from the minimum and maximum calculator 1b, and performs calculation by selecting, from the hue data, two data Q1 and Q2 which are not zero, and from the hue data y, m and c, two data P1 and P2 which are not of a value zero. This operation is identical to that described with reference to FIG. 2 in connection with Embodiment 1, so that detailed description thereof is omitted.

The output of the polynomial arithmetic unit 3 is supplied to the matrix calculator 4, and the coefficient generator 5 generates the calculation coefficients U (Fij) and fixed coefficients U (Eij) for the polynomial data based on the identification code S1, and sends the same to the matrix calculator 4. The matrix calculator 4 receives the hue data c, m and y from the hue data calculator 2b, the polynomial data T1 to T5 from the polynomial arithmetic unit 3 and the coefficients U From the coefficient generator 5, and outputs the results of calculation according to the following formula (20) as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T1 \\ T2 \\ T3 \\ T4 \\ T5 \end{bmatrix} \quad (20)$$

For (Eij), i=1 to 3 and j=1 to 3, and for (Fij), i=1 to 3 and j=1 to 5.

The operation at the matrix calculator 4 is similar to that described with reference to FIG. 5 in connection with Embodiment 1, but the inputted hue data is c (or m, y) and C1 (or M1, Y1) is calculated and outputted. The detailed description thereof is therefore omitted.

The synthesizer 6 receives the image data C1, M1 and Y1 from the matrix calculator 4 and the minimum value α outputted from the minimum and maximum calculator 1b representing the achromatic data, performs addition, and outputs image data C, M and Y. The equation used for obtaining the image data color-converted by the color-conversion method of FIG. 11 is therefore given by the following formula (2).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (2)$$

Here, for (Eij), i=1 to 3 and j=1 to 3, and for (Fij), i=1 to 3 and j=1 to 18, and hry=min (aq1*g, ap1*m),
hrm=min (aq2*b, ap2*y),
hgy=min (aq3*r, ap3*c),
hgc=min (aq4*b, ap4*y),
hbm=min (aq5*r, ap5*c), and
hbc=min (aq6*g, ap6*m), and aq1 to aq6 and aq1 to ap6 indicate calculation coefficients generated by the calculation coefficient generator 15 of FIG. 2.

The difference between the number of calculation terms in the formula (2) and the number of calculation terms in FIG. 11 is that FIG. 11 shows a method of calculation for each pixel excluding data resulting in the calculation terms which are of a value zero, while the formula (2) represents a general formula for a set of pixels. In other words, eighteen polynomial data for one pixel of the formula (2) can be reduced to five effective data, and this reduction is achieved by exploiting a characteristic of the hue data.

The combination of effective data is changed according to image data of the target pixel. For all image data, all the polynomial data can be effective.

The calculation terms output from the polynomial arithmetic unit based on the formula (2) are identical to those of the formula (1) in Embodiment 1. Thus, relations between the six hues and inter-hue areas and effective calculation terms are the same as those shown in FIG. 10A and FIG. 10B. Therefore, as in Embodiment 1, in the coefficient generator 5, by changing the coefficients for an effective calculation term for a hue or for an inter-hue area to be adjusted, only the target hue can be adjusted. In addition, by changing the coefficients in the calculation coefficient generator 15 in the polynomial arithmetic unit 3, part of the inter-hue area where the calculation term in the inter-hue area is effective can be changed without giving any influence to the other hues.

Here, an example of coefficients generated by the coefficient generator 5 of Embodiment 2 are the coefficients U (Eij) of the formula (17), as in Embodiment 1. If the coefficients U (Fij) are all zero, no color conversion is executed. Also, if those of the coefficients U (Fij) of the formula (18) which relate to the second-order calculation terms which are product terms are all zero, and correction is performed based on the coefficients for a fraction term and a calculation term in the form of comparison-result data, which are first-order calculation terms. Accordingly, only a hue or an inter-hue area can be linearly adjusted. By setting coefficients relating to a first-order calculation term For a hue or an inter-hue area to be changed and setting other coefficients to zero, only the target hue or inter-hue area can be adjusted.

As apparent from the foregoing, by changing the coefficients of the product and fraction terms relating to specific hues, it is possible to adjust only the target hue among the six hues of red, blue, green, yellow, cyan and magenta, without influencing other hues, and by changing the coefficients relating to the first-order calculation term in the form of the comparison-result data based on the hue data, it is possible to correct the six inter-hue areas of red-yellow, yellow-green, green-cyan, cyan-blue, blue-magenta, and magenta-red.

Each of the foregoing product terms is a second-order calculation for chroma, and each of the fraction terms is a first-order calculation for chroma. Accordingly, by using both of the product term and the fraction term, the non-linearity of an image-printing or the like can be corrected for chroma. Provided therefore is a color conversion device or a color conversion method, which is capable of flexibly changing a conversion characteristic and eliminates the necessity of a large-capacity memory.

Furthermore, in Embodiment 2 described above, the processing was performed by the hardware configuration of FIG. 11. Needless to say, the same processing can be performed by software in the color conversion device, and in this case, the same effects as those of Embodiment 2 will be provided.

Embodiment 3

In Embodiment 1, part of an example of configuration of the matrix calculator 4 is as shown in the block diagram of FIG. 5, and the hue data and the respective calculation terms and the minimum value α among the image data R, G and B which is achromatic data are added to output the image data R, G, B, as shown in Formula (1). It is possible to adopt a configuration shown in FIG. 12 in which coefficients for the minimum value α which is achromatic data are generated in the coefficient generator, to adjust the achromatic component.

Figure 12:
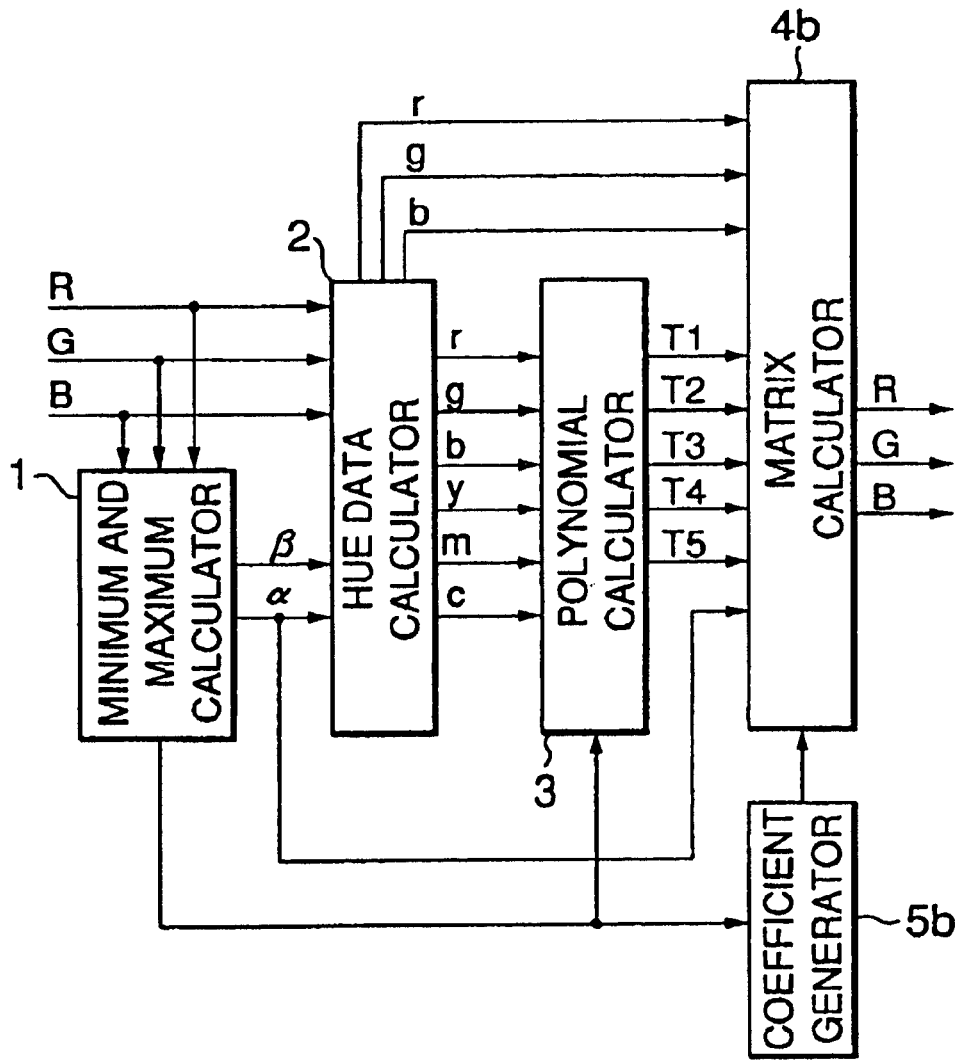
FIG. 12 is a block diagram showing an example of configuration of Embodiment 3 of the present invention.

FIG. 12 is a block diagram showing an example of configuration of a color conversion device and a color conversion method of Embodiment 3 of the present invention. In the figure, reference numerals 1 to 3 denote members identical to those described with reference to FIG. 1 in connection with Embodiment 1. Reference numeral 4b denotes a matrix calculator, 5b denotes a coefficient generator.

The operation will next be described. The determination of the maximum value β, the minimum value α, and the identification code S1 from the inputted data at the minimum and maximum calculator 1, the calculation of the six hue data at the hue data calculator 2, and the determination of the calculation term at the polynomial arithmetic unit 3 are identical to those of Embodiment 1, and detailed description thereof is therefore omitted.

The coefficient generator 5b in FIG. 12 generates the calculation coefficients U (Fij) and the fixed coefficients U (Eij) of the polynomial data based on the identification code S1 and sends them to the matrix calculator 4b. The matrix calculator 4b receives the hue data r, g, and b from the hue data calculator 2, the polynomial data T1 to T5 from the polynomial arithmetic unit 3, the minimum value α from the minimum and maximum calculator 1, and the coefficients U from the coefficient generator 5b, and performs calculation thereon. The equation used for the calculation is represented by the following formula (21), and the achromatic component is adjusted.

$$\begin{bmatrix} R \\ G \\ B \end{bmatrix} = (Eij) \begin{bmatrix} r \\ g \\ b \end{bmatrix} + (Fij) \begin{bmatrix} T1 \\ T2 \\ T3 \\ T4 \\ T5 \\ \alpha \end{bmatrix} \quad (21)$$

For (Eij), i=1 to 3 and j=1 to 3, and for (Fij), i=1 to 3 and j=1 to 6.

Figure 13:
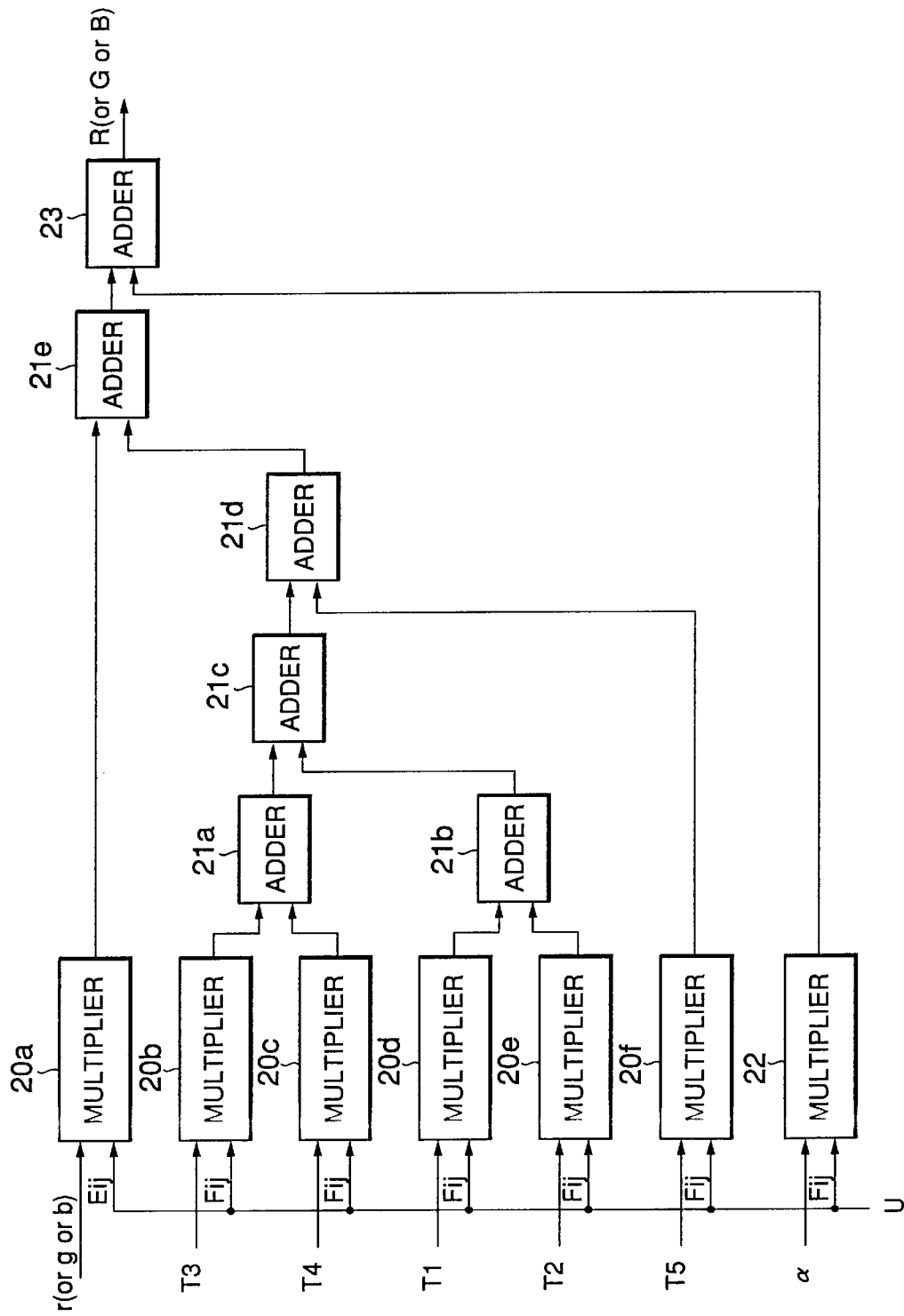
FIG. 13 is a block diagram showing part of an example of configuration or a matrix calculator included in the color conversion device of Embodiment 3.

FIG. 13 is a block diagram showing an example of configuration of the matrix calculator 4b. In FIG. 13, reference numerals 20a to 20f and 21a to 21f denote members identical to those in the matrix calculator 4 of Embodiment 1. Reference numeral 22 denotes a multiplier receiving the minimum value α from the minimum and maximum calculator 1 indicating the achromatic component, and the coefficients U from the coefficient generator 5b, and performs multiplication thereon. Reference numeral 23 denotes an adder.

Next, the operation will be described. The multipliers 20a to 20f receives the hue data r, the polynomial data T1 to T5 from the polynomial arithmetic unit 3 and the coefficients U (Eij) and U (Fij) from the coefficient generator 5, and then output the products thereof. The adders 21a to 21e add the products and sums. These operations are identical to those of the matrix calculator 4 in Embodiment 1. The multiplier 22 receives the minimum value α among the R, G and B data, from the minimum and maximum calculator 1 which corresponds to the achromatic component, and the coefficients U (Fij) from the coefficient generator 5b, and performs multiplication, and outputs the product to the adder 23, where the products are added to the output of the adder 21e, and the sum total is output as the output R of the image data R. In the example of FIG. 13, if the hue data r is replaced by g or b, the image data G or B is calculated.

The part of the coefficients (Eij) and (Fij) corresponding to the hue data r, g and b are used. In other words, if three configuration, each similar to that of FIG. 13, are used in parallel for the hue data r, g and b, matrix calculation can be performed at a higher speed.

The matrix calculator 4b performs calculation on the calculation terms, and the minimum value α which is the achromatic data, and adds the results to the hue data, to output the image data R, C, B. The equation for determining the image data is represented by the following formula (3).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (3)$$

For (Eij), i=1 to 3 and j=1 to 3, and for (Fij), i=1 to 3 and j=1 to 19.

The difference between the number of calculation terms in the formula (3) and the number of calculation terms in FIG. 12 is that, as in Embodiment 1, FIG. 12 shows a method of calculation for each pixel excluding data resulting in calculation terms in the polynomial data arithmetic unit which are of a value zero, while the formula (3) represents a general formula for a set of pixels. In other words, nineteen polynomial data for one pixel or the formula (3) can be reduced to six effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients of the product and fraction terms relating to specific hues, and the first-order terms relating to the inter-hue areas, it is possible to adjust only the target hue or inter-hue area among the six lines of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

In Embodiment 3 described above, the image data R, G, B are obtained after the matrix calculation. As an alternative, the output image data R, G, B are first obtained, and R, C, B may be converted to C, M, Y. If the coefficients used in the matrix calculation can be changed for the respective hues, the inter-hue areas, and the minimum value α which is achromatic data, effects similar to those discussed above can be obtained.

Furthermore, also in Embodiment 3, the above described processing can be performed by software in the color conversion device, as in Embodiment 1, and yet effects similar to those obtained by Embodiment 3 can be obtained.

Embodiment 4

Embodiment 2 was configured to add the hue data, the calculation terms, and the minimum value α which is achromatic data, as shown in Formula (2). As an alternative, the configuration may be such that coefficients for the minimum value α which is achromatic data is generated at the coefficient generator, as shown in FIG. 14, so that the achromatic component is thereby adjusted.

Figure 14:
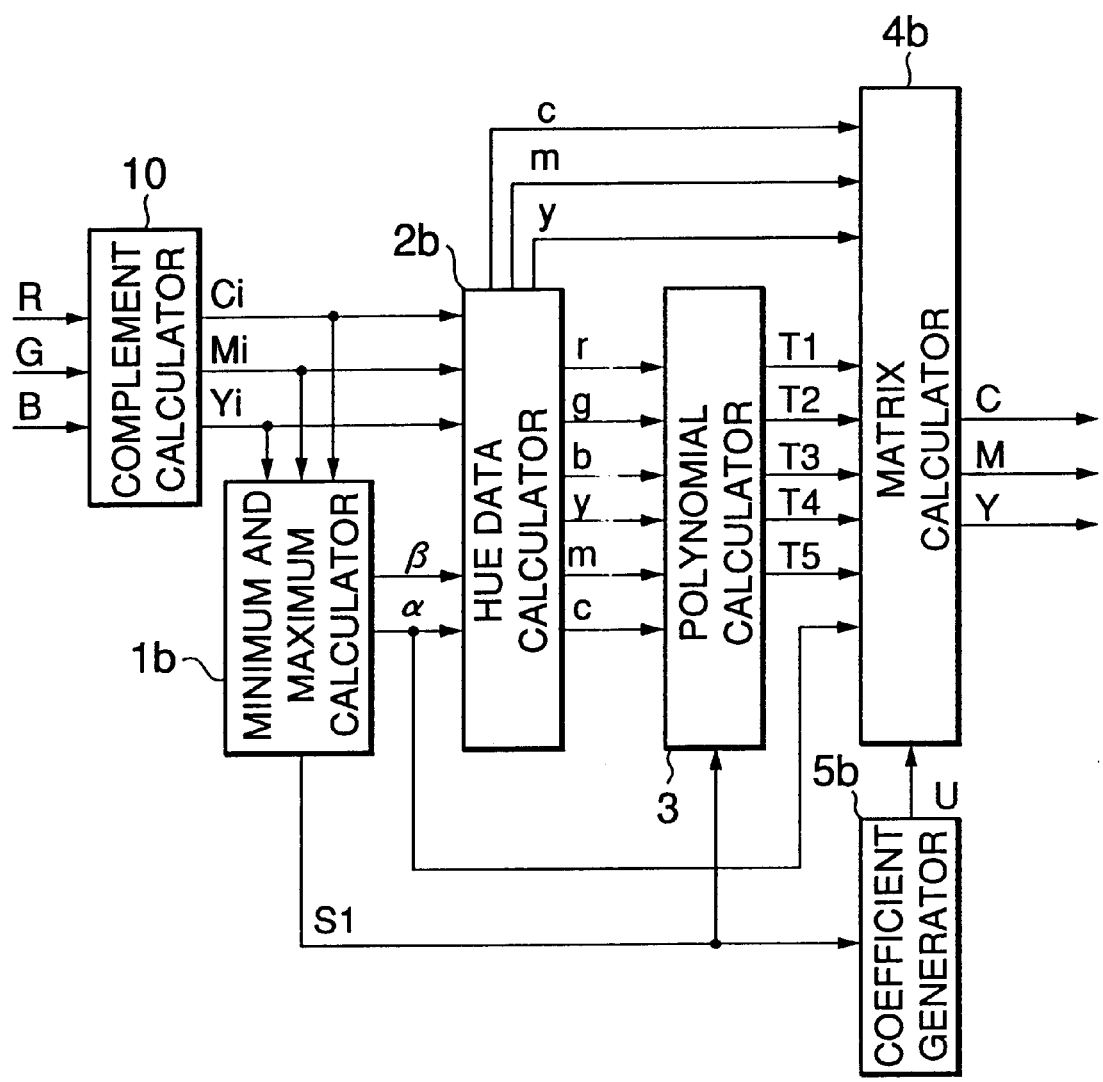
FIG. 14 is a block diagram showing an example of configuration of a color conversion device of Embodiment 4 of the present invention.

FIG. 14 is a block diagram showing an example of configuration of color conversion device and color conversion method according to Embodiment 4 or the invention. In the figure, reference numerals 10, 1b, 2b and 3 denote members identical to those described with reference to FIG. 11 in connection with Embodiment 2, and reference numerals 4b and 5b denote members identical to those described with reference to FIG. 12 in connection with Embodiment 3.

The operation will next be described. The image data R, G, B are input to the complement calculator 10 to obtain the complementary data Ci, Mi, Yi by the process of determining 1's complement. The determination of the maximum value β, the minimum value α and the identification code S1 at the minimum and maximum calculator 1b, the calculation of the six hue data at the hue data calculator 2b, and the determination of the calculation terms at the polynomial arithmetic unit 3 are identical to those in the case of the complementary data C, M, Y in Embodiment 2. The detailed description thereof are therefore omitted.

The coefficient generator 5b in FIG. 14 generates the calculation coefficients U (Fij) and the fixed coefficients U (Eij) of the polynomial data based on the identification code S1 and sends them to the matrix calculator 4b. The matrix calculator 4b receives the hue data c, m, and y from the hue data calculator 2b, the polynomial data T1 to T5 from the polynomial arithmetic unit 3, the minimum value α from the minimum and maximum calculator 1, and the coefficients U from the coefficient generator 5b, and performs calculation thereon. The equation used for the calculation is represented by the following formula (22), and the achromatic component is adjusted.

$$\begin{bmatrix} C \\ M \\ Y \end{bmatrix} = (Eij) \begin{bmatrix} c \\ m \\ y \end{bmatrix} + (Fij) \begin{bmatrix} T1 \\ T2 \\ T3 \\ T4 \\ T5 \\ \alpha \end{bmatrix} \quad (22)$$

For (Eij), i=1 to 3 and j=1 to 3, and for (Fij), i=1 to 3 and j=1 to 6.

The operation at the matrix calculator 4b is similar to that described with reference to FIG. 13 in connection with Embodiment 3, but the inputted hue data is c (or m, y) and C (or M, Y) is calculated and outputted. The detailed description thereof is therefore omitted.

The matrix calculator 4b performs calculation on the calculation terms, and the minimum value α which is the achromatic data, and adds the results to the hue data, to output the image data C, M, Y. The equation for determining the image data is represented by the following formula (4).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (4)$$

For (Eij), i=1 to 3 and j=1 to 3, and for (Fij), i=1 to 3 and j=1 to 19.

The difference between the number of calculation terms in the formula (4) and the number of calculation terms in FIG. 14 is that, as in Embodiment 2, FIG. 14 shows a method of calculation for each pixel excluding data resulting in calculation terms in the polynomial data arithmetic unit which are of a value zero, while the formula (4) represents a general formula for a set of pixels. In other words, nineteen polynomial data for one pixel of the formula (4) can be reduced to six effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients of the product and fraction terms relating to specific hues, and the first-order terms relating to the inter-hue areas, it is possible to adjust only the target hue or inter-hue area among the six lines of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

Furthermore, also in Embodiment 4, the above described processing can be performed by software in the color conversion device, as in the above-described Embodiment, and yet effects similar to those obtained by Embodiment 4 can be obtained.

Embodiment 5

In Embodiments 1 to 4, an example of the configuration of the polynomial arithmetic unit 3 is assumed to be as shown in the block diagram of FIG. 2, and the polynomial data shown in formulae (1) to (4) are calculated and outputted. As an alternative, the polynomial arithmetic unit 3 may be configured as shown in FIG. 15 to calculate polynomial data.

Figure 15:
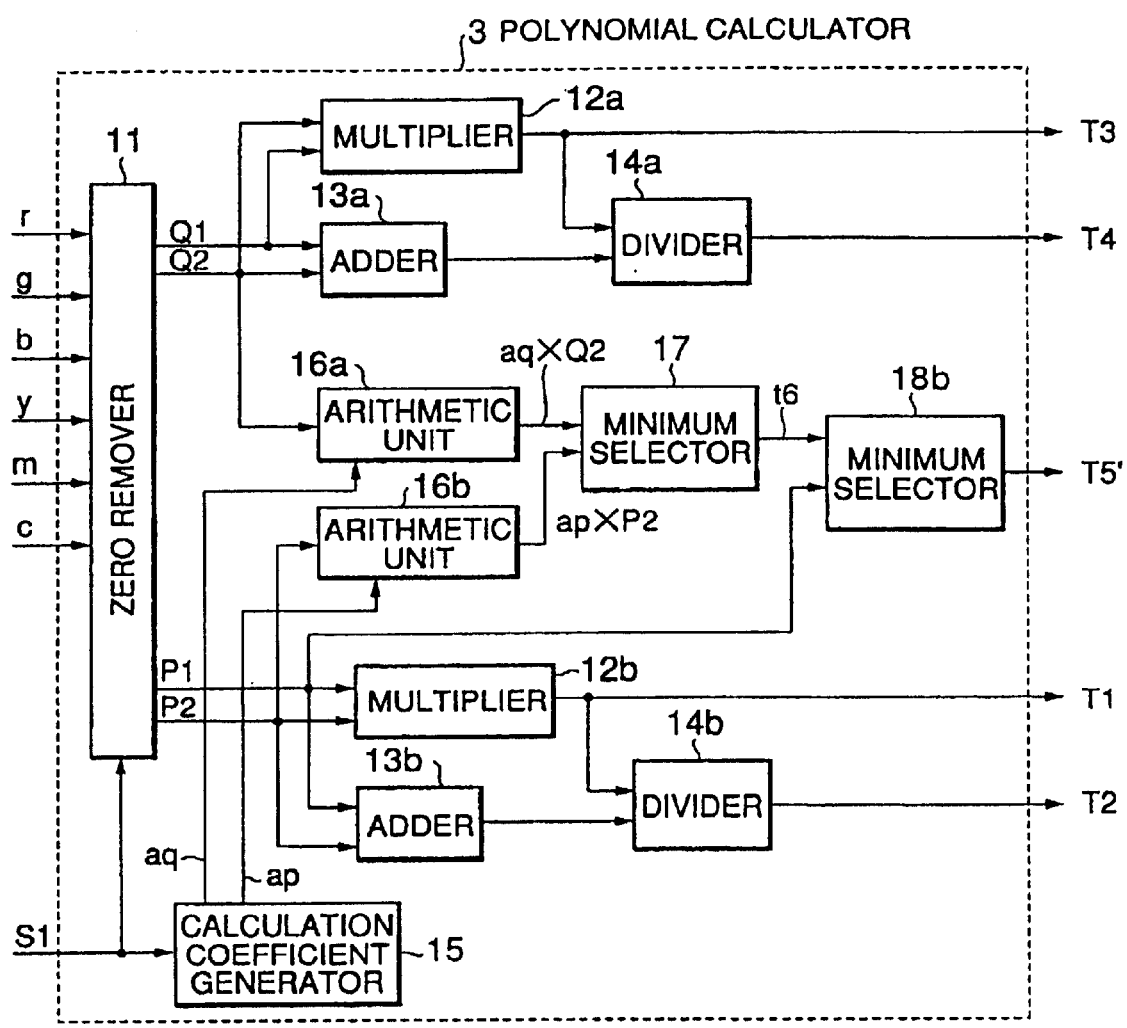
FIG. 15 is a block diagram showing another example of configuration of a polynomial arithmetic unit included in a color conversion device of Embodiment 5 of the present invention.
Figure 16A:
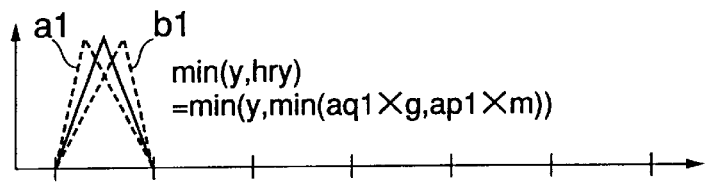
FIG. 16A to FIG. 16F are diagrams schematically showing the relationship between a calculation term in the form of comparison-result data and a hue in the color conversion device of Embodiment 5.
Figure 16B:
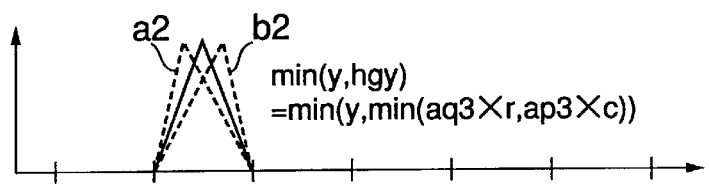
Figure 16C:
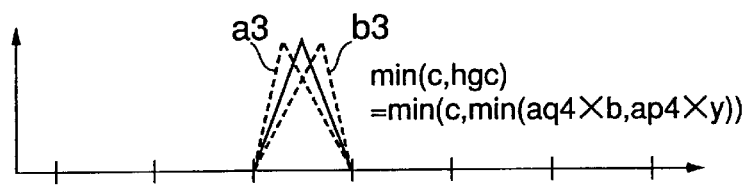
Figure 16D:
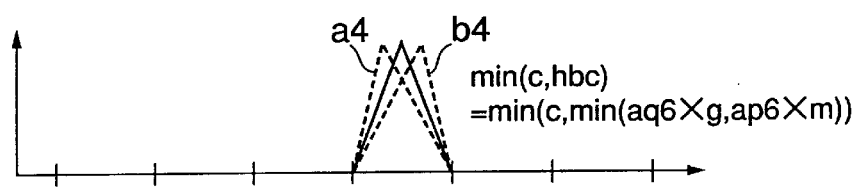
Figure 16E:
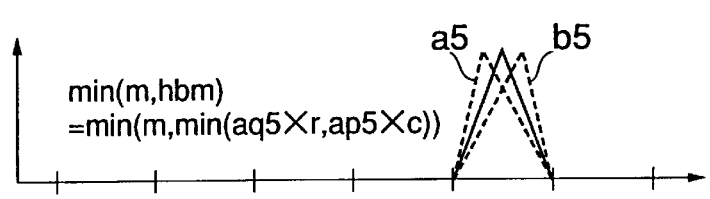
Figure 16F:
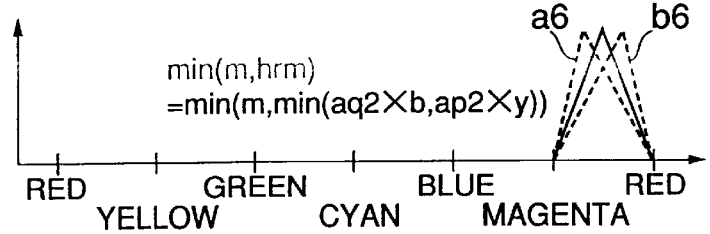

FIG. 15 is a block diagram showing another example of configuration of the polynomial arithmetic unit 3. In the figure, reference numerals 11 to 17 denote members identical to those of the polynomial arithmetic unit in FIG. 2. Reference numeral 18b denotes a minimum selector selecting and outputting the minimum value among the inputted data.

The operation of the polynomial arithmetic unit of FIG. 15 will next be described. The operation of the zero remover 11, the operation of the multipliers 12a and 12b, the adders 13a and 13b, and the dividers 14a and 14b to determine T3=Q1*Q2, T4=T3/(Q1+Q2), T1=P1*P2, T2=T1/(P1+P2), and the operations of the calculation coefficient generator 15, the arithmetic units 16a and 16b, and the minimum selector 17 up to outputting t6=min (aq*Q2, ap*P2) are identical to those described with reference to FIG. 2 in connection with the above embodiment, and detailed description thereof is therefore omitted.

The output t6=min (aq*Q2, ap*P2) from the minimum selector 17 is outputted to the minimum selector 18b, to which the output data P1 from the zero remover 11 is also inputted, and the minimum value T5'=min (P1, min (aq*Q2, ap*P2)) between P1 and t6=min (aq*Q2, ap*P2)) is outputted. Accordingly, the polynomial data T1, T2, T3, T4 and T5' are outputs of the polynomial arithmetic unit of FIG. 15. The outputs of the polynomial arithmetic unit are sent to the matrix calculator 4 or 4b.

According to the polynomial arithmetic unit 3 in FIG. 15, the equation used for obtaining the image data R, C, B color-converted by the color-conversion method of FIG. 1 in Embodiment 1 is therefore given by the following formula (5).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (5)$$

Here, for (Eij), i=1 to 3 and j=1 to 3, and for (Fij), i=1 to 3 and j=1 to 18, and hry=min (aq1*g, ap1*m),
hrm=min (aq2*b, ap2*y),
hgy=min (aq3*r, ap3*c),
hgc=min (aq4*b, ap4*y),
hbm=min (aq5*r, ap5*c), and
hbc=min (aq6*g, ap6*n), and aq1 to aq6 and apt to ap6 indicate calculation coefficients generated by the calculation coefficient generator 15 of FIG. 15.

The difference between the number of calculation terms in the formula (5) and the number of calculation terms in FIG. 15 is that FIG. 15 shows a method of calculation for each pixel excluding data resulting in calculation terms which is of a value zero, while the formula (5) represents a general formula for a set of pixels. In other words, eighteen polynomial data for one pixel of the formula (5) can be reduced to rive effective data, and this reduction is achieved by exploiting a characteristic of the hue data. The combination of effective data is changed according to image data of the target pixel. For all image data, all the polynomial data can be effective.

FIG. 16A to FIG. 16F schematically show relations between the six hues and first-order calculation terms in the form of the comparison-result data, min (y, hry), min (y, hgy), min (c, hgc), min (c, hbc), min (m, hbm) and min (m, hrm). The broken lines in the figures a1 to a6, and b1 to b6 indicate the characteristics obtained when the calculation coefficients aq1 to aq6 and ap1 to ap6 in hry, hrm, hgy, hgc, hbm, and hbc are varied, and the solid lines indicate the characteristics obtained when the calculation coefficients aq1 to aq6 and aq1 to ap6 are set to "1". It can be understood from FIG. 16A to FIG. 16F, that the first-order calculation terms in the form of the comparison-result data relate to changes in the six inter-hue areas of red-green, yellow-green, green-cyan, cyan-blue, blue-magenta, and magenta-red. In other words, b=c=0 hold for red-yellow, and the five terms other than min (y, hry) are all zero. Accordingly, only min (y, hry) is an effective first-order calculation term. Similarly, only min (y, hgy) is an effective first-order calculation term for yellow-green; min (c, hgc) for green-cyan; min (c, hbc) for cyan-blue; min (m, hbc) for blue-magenta; and min (m, hrm) for magenta-red.

FIG. 17A to FIG. 17B respectively show relations between the six hues and inter-hue areas and effective calculation terms. Thus, if the coefficient generator changes coefficients for a calculation term effective for a hue or an inter-hue area to be adjusted, only the target hue can be adjusted.

Further, if coefficients in the calculation coefficient generator 15 in the polynomial arithmetic unit 3 are changed, part of the inter-hue area where a calculation term in the inter-hue area is effective can be changed without giving any influence to the other hues.

As apparent from the foregoing, by changing the coefficients of the product and fraction terms relating to specific hues, it is possible to adjust only the target hue among the six hues of red, blue, green, yellow, cyan and magenta, without influencing other hues, and by changing the coefficients relating to the first-order calculation term in the form of the comparison-result data based on the hue data, it is possible to correct the six inter-hue areas of red-yellow, yellow-green, green-cyan, cyan-blue, blue-magenta, and magenta-red.

Each of the foregoing product terms is a second-order calculation for chroma, and each of the fraction terms is a first-order calculation for chroma. Accordingly, by using both of the product term and the fraction term, the non-linearity of an image-printing or the like can be corrected for chroma. Provided therefore is a color conversion device or a color conversion method, which is capable of flexibly changing a conversion characteristic and eliminates the necessity of a large-capacity memory.

Furthermore, in Embodiment 5 described above, the processing was performed by the hardware configuration of FIG. 15. Needless to say, the same processing can be performed by software in the color conversion device, and in this case, the same effects as those of Embodiment 5 will be provided.

Embodiment 6

According to the polynomial arithmetic unit 3 described with reference to FIG. 15 in connection with Embodiment 5, the equation for determining the color-converted image data C, M, Y by the method described with reference to FIG. 11 in connection with Embodiment 2 is given by the following formula (6).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (6)$$

Here, For (Eij), i=1 to 3 and j=1 to 3, and for (Fij), i=1 to 3 and j=1 to 18, and hry=min (aq1*g, ap1*m), hrm=min (aq2*b, ap2*y), hgy=min (aq3*r, ap3*c), hgc=min (aq4*b, ap4*y), hbm=min (aq5*r, ap5*c), and hbc=min (aq6*g, ap6*m), and aq1 to aq6 and ap1 to ap6 indicate calculation coefficients generated by the calculation coefficient generator 15 of FIG. 15.

The difference between the number of calculation terms in the formula (6) and the number of calculation terms in FIG. 15 is that FIG. 15 shows a method of calculation for each pixel excluding data resulting calculation terms which are of a value zero, while the formula (6) represents a general formula for a set of pixels. In other words, eighteen polynomial data for one pixel of the formula (6) can be reduced to rive effective data, and this reduction is achieved by exploiting a characteristic of the hue data. Moreover, the combination of effective data is changed according to image data of the target pixel. For all image data, all the polynomial data can be effective.

The calculation terms output from the polynomial arithmetic unit based on the formula (6) are identical to those of the formula (5) in Embodiment 5. Thus, relations between the six lines and inter-hue areas and effective calculation terms are the same as those shown in FIG. 17A and FIG. 17B. Therefore, as in Embodiment 5, in the coefficient generator, by changing the coefficients for an effective calculation term for a hue or for an inter-hue area to be adjusted, only the target hue can be adjusted. In addition, by changing the coefficients in the calculation coefficient generator 15 in the polynomial arithmetic unit 3, part of the inter-hue area where a calculation term in the inter-hue area is effective can be changed without giving any influence to the other hues.

As apparent from the foregoing, by changing the coefficients of the product and fraction terms relating to specific hues, it is possible to adjust only the target hue among the six hues of red, blue, green, yellow, cyan and magenta, without influencing other hues, and by changing the coefficients relating to the first-order calculation term in the form of the comparison-result data based on the hue data, it is possible to correct the six inter-hue areas of red-yellow, yellow-green, green-cyan, cyan-blue, blue-magenta, and magenta-red.

Each of the foregoing product terms is a second-order calculation for chroma, and each of the fraction terms is a first-order calculation for chroma. Accordingly, by using both of the product term and the fraction term, the nonlinearity of an image-printing or the like can be corrected for chroma. Provided therefore is a color conversion device or a color conversion method, which is capable of flexibly changing a conversion characteristic and eliminates the necessity of a large-capacity memory.

Embodiment 7

According to the polynomial arithmetic unit 3 described with reference to FIG. 15 in connection with Embodiment 5, the equation for determining the color-converted image data R, G, B by the method described with reference to FIG. 12 in connection with Embodiment 3 is given by the following formula (7).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (7)$$

For (Eij), i=1 to 3 and j=1 to 3, and for (Fij), i=1 to 3 and j=1 to 19.

The difference between the number of calculation terms in the formula (7) and the number of calculation terms in FIG. 15 is that FIG. 15 shows a method of calculation for each pixel excluding data resulting in calculation terms in the polynomial data arithmetic unit which are of a value zero, while the formula (7) represents a general formula for a set of pixels. In other words, nineteen polynomial data for one pixel or the formula (7) can be reduced to six effective data, and this reduction is achieved by exploiting a characteristic of the hue data. Moreover, the combination of effective data is changed according to image data of the target pixel. For all image data, all the polynomial data can be effective.

As apparent from the foregoing, by changing the coefficients of the product and fraction terms relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

Embodiment 8

According to the polynomial arithmetic unit 3 described with reference to FIG. 15 in connection with Embodiment 5, the equation for determining the color-converted image data C, M, Y by the method described with reference to FIG. 14 in connection with Embodiment 4 is given by the following formula (8).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (8)$$

For (Eij), i=1 to 3 and j=1 to 3, and for (Fij), i=1 to 3 and j=1 to 19.

The difference between the number of calculation terms in the formula (8) and the number of calculation terms in FIG. 15 is that FIG. 15 shows a method of calculation for each pixel excluding data resulting in calculation terms in the polynomial data arithmetic unit which are of a value zero, while the formula (8) represents a general formula for a set of pixels. In other words, nineteen polynomial data for one pixel of the formula (8) can be reduced to six effective data, and this reduction is achieved by exploiting a characteristic of the hue data. Moreover, the combination of effective data is changed according to image data of the target pixel. For all image data, all the polynomial data can be effective.

As apparent from the foregoing, by changing the coefficients of the product and fraction terms relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue area, and by changing the coefficients relating to the minimum value α which is the achromatic data, it is possible to adjust only the achromatic component without influencing the hue components, and choose between a standard black, reddish black, bluish black and the like.

Embodiment 9

Figure 18:
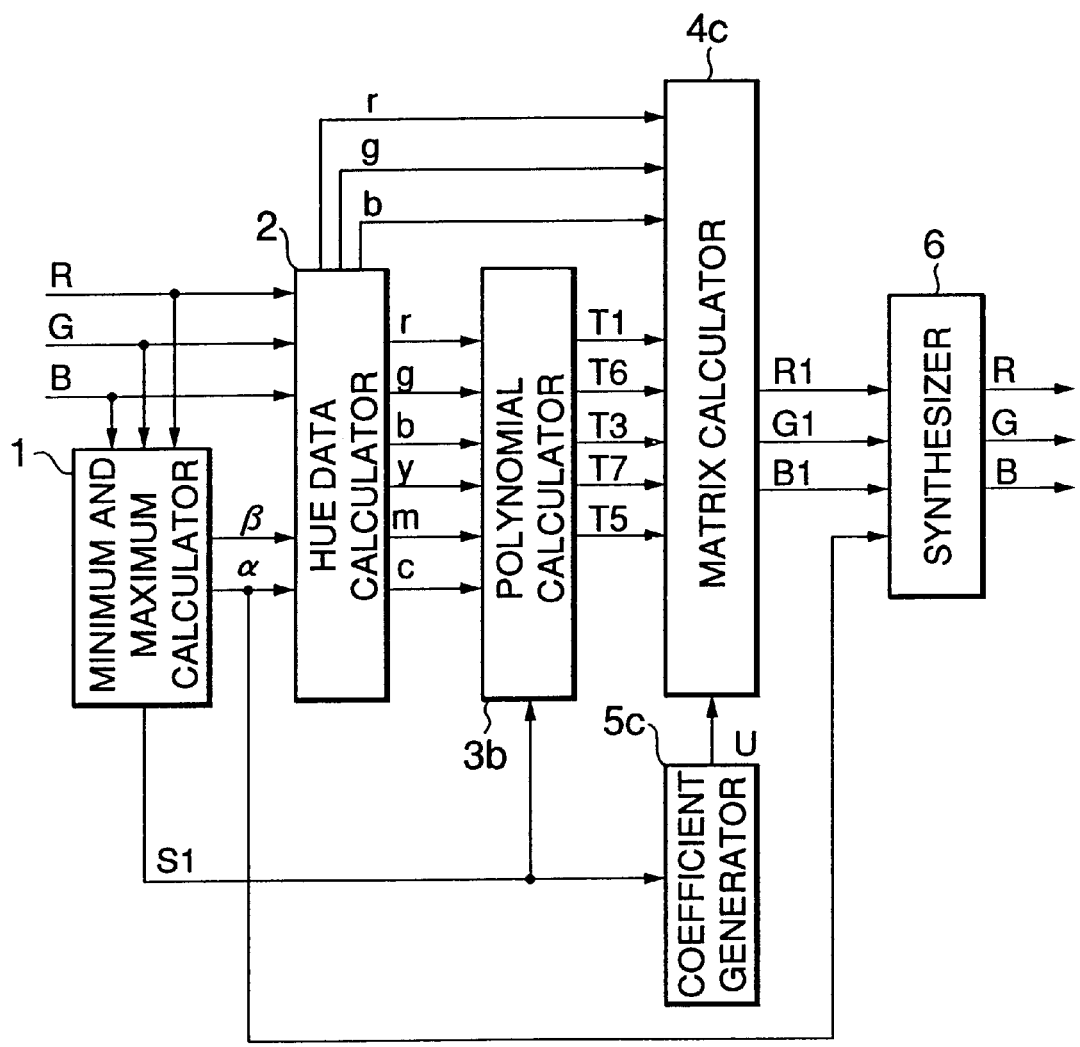
FIG. 18 is a block diagram showing an example of configuration of a color conversion device of Embodiment 9 of the present invention.

FIG. 18 is a block diagram showing another example of configuration of a color conversion device and color conversion method according to Embodiment 9 of the invention. In the figure, reference numerals 1, 2 and 6 denote members identical to those described with reference to FIG. 1 in connection with Embodiment 1. Reference numeral 3b denotes a polynomial arithmetic unit, 4c denotes a matrix calculator, and 5c denotes a coefficient generator.

Figure 19:
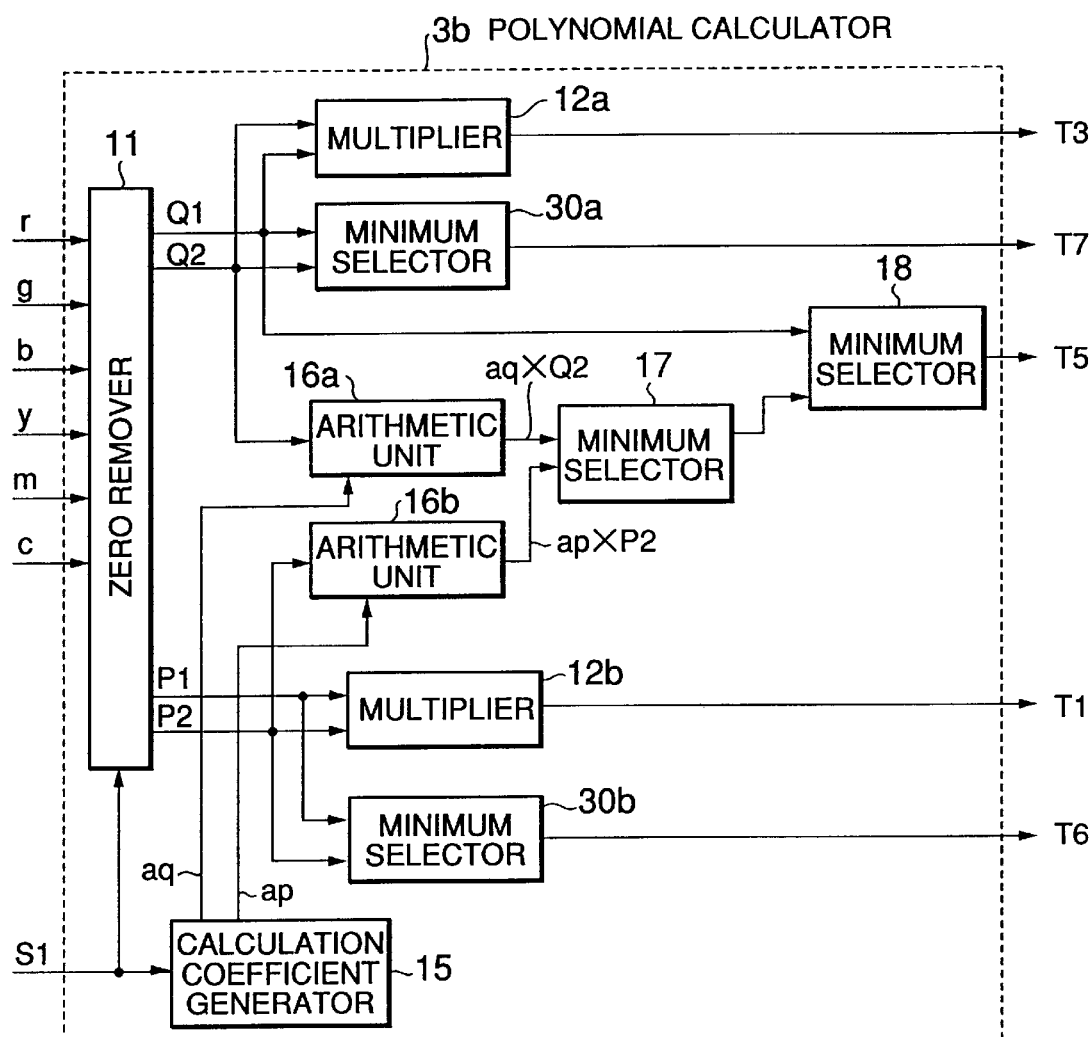
FIG. 19 is a block diagram showing an example of configuration of a polynomial arithmetic unit included in the color conversion device of Embodiment 9.
Figure 21A:
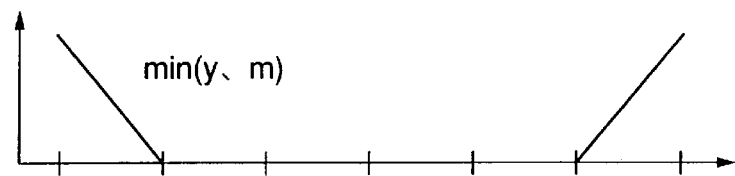
FIG. 21A to FIG. 21F are diagrams schematically showing the relationship between a calculation term in the form of comparison-result data and a hue in the color conversion device of Embodiment 9.
Figure 21B:
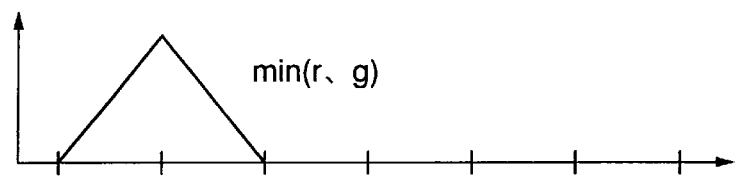
Figure 21C:
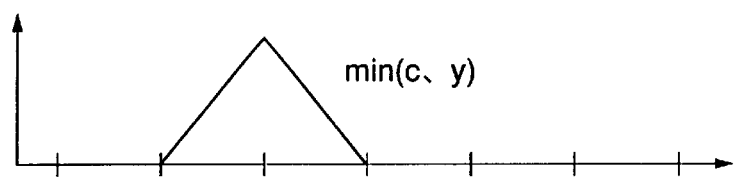
Figure 21D:
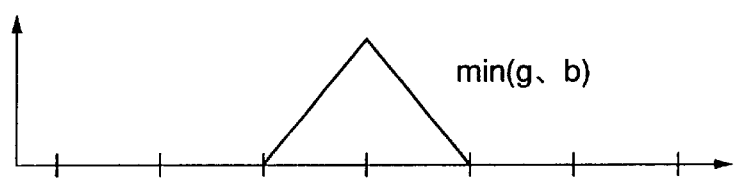
Figure 21E:
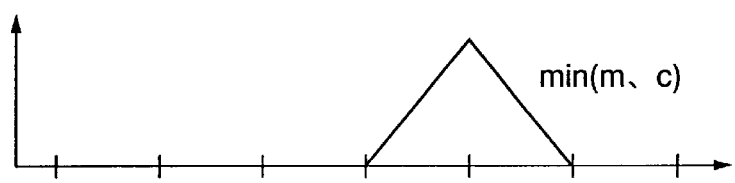
Figure 21F:
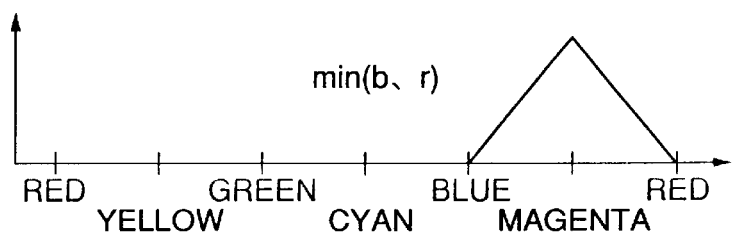

FIG. 19 is a block diagram showing an example of configuration of the polynomial arithmetic unit 3b. In the figure, reference numerals 11, 12a and 12b, 15 to 18 denote members identical to those in the polynomial arithmetic unit 3 described with reference to FIG. 2 in connection with Embodiment 1. Reference numerals 30a and 30b denote a minimum selector selecting and outputting the minimum value among the inputted data.

The operation will next be described. The operations of the minimum and maximum calculator 1, and the hue data calculator 2 in FIG. 18 are identical to those in Embodiment 1, and detailed description thereof is therefore omitted. The polynomial arithmetic unit 3b selects and performs calculation on the two non-zero data Q1 and Q2 among r, g, b, and the two non-zero data P1 and P2 among y, m, c based on the identification code S1 from the minimum and maximum calculator 1. This operation is described with reference to FIG. 19.

In the polynomial arithmetic unit 3b, the inputted hue data r, g, b, y, m, c and the identification code S1 are supplied to the zero remover 11, and based on the identification code S1, the two non-zero data Q1 and Q2 among r, g, b, and the two non-zero data P1 and P2 are outputted. The multiplier 12a receives the outputted data Q1 and Q2 from the zero remover 11, and determines and outputs the product T3=Q1*Q2. The multiplier 12b receives the outputted data P1 and P2 From the zero remover 11, and determines and outputs the product. T1=P1*P2. The operations up to this point are identical to those described with reference to FIG. 2 in connection with Embodiment 1, and the operations at the calculation coefficient generator 15, the arithmetic units 16a and 16b, and the minimum selectors 17 and 18 are identical to those in Embodiment 1. Detailed description is therefore omitted.

The coefficient generator 5c shown in FIG. 18 generates calculation coefficients U (Fij) and fixed coefficients U (Eij) for the polynomial data based on the identification code S1, and sends the same to the matrix calculator 4c. The matrix calculator 4c receives the hue data r, g and b from the hue data calculator 2, the polynomial data T1, T3, T5, T6, T7 from the polynomial arithmetic unit 3b and the coefficients U from the coefficient generator 5, and outputs the results of calculation according to the following formula (23) as image data R, G and B.

$$\begin{bmatrix} R1 \\ G1 \\ B1 \end{bmatrix} = (Eij) \begin{bmatrix} r \\ g \\ b \end{bmatrix} + (Fij) \begin{bmatrix} T1 \\ T6 \\ T3 \\ T7 \\ T5 \end{bmatrix} \quad (23)$$

For (Eij), i=1 to 3 and j=1 to 3, and for (Fij), i=1 to 3 and j=1 to 5.

FIG. 20, which is a block diagram, shows an example of configuration of part or the matrix calculator 4c. Specifically, it shows how R1 is calculated and outputted. In the drawing, reference numerals 20a to 20f and 21a to 21e denote members identical to those in FIG. 5.

Next, the operation of the matrix calculator 4c of FIG. 20 will be described. The multipliers 20a to 20f receives the hue data r, the polynomial data T1, T3, T5, T6, T7 from the polynomial arithmetic unit 3b and the coefficients U (Eij) and U (Fij) from the coefficient generator 5c, and then output the products thereof. The adders 21a and 21b receive the products outputted from the multipliers 20b to 20e, add the inputted data and outputs the sums thereof. The adder 21c adds the data from the adders 21a and 21b, and the adder 21d adds the output from the adder 21c and the product outputted from the multiplier 20f. The adder 21e adds the output from the adder 21d and the output from the multiplier 20a, and outputs the sum total thereof as image data R1. In the example of configuration shown in FIG. 20, if the hue data r is replaced by the hue data g or b, image data G1 or Bi can be calculated.

The part of the coefficients (Eij) and (Fij) corresponding to the hue data r, g and b are used. In other words, if three configuration, each similar to that of FIG. 20, are used in parallel for the hue data r, g and b, matrix calculation can be performed at a higher speed.

The synthesizer 6 receives the image data R1, G1 and B1 from the matrix calculator 4c and the minimum value α outputted from the minimum and maximum calculator 1 representing the achromatic data, performs addition, and outputs image data R, G and B. The equation used for obtaining the image data color-converted by the color-conversion method of FIG. 18 is therefore given by the following formula (9).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (9)$$

Here, For (Eij), i=1 to 3 and j=1 to 3, and for (Fij), i=1 to 3 and j=1 to 18.

The difference between the number or calculation terms in the formula (9) and the number of calculation terms in FIG. 18 is that FIG. 18 shows a method of calculation for each pixel excluding data resulting in calculation terms which in the polynomial arithmetic unit 3b which are of a value zero, while the formula (9) represents a general formula for a set of pixels. In other words, eighteen polynomial data for one pixel of the formula (9) can be reduced to five effective data, and this reduction is achieved by exploiting a characteristic of the hue data. Moreover, the combination of effective data is changed according to image data of the target pixel. For all image data, all the polynomial data can be effective.

FIG. 21A to FIG. 21F schematically show relations between the six hues and the calculation terms in the form of the comparison-result data, min (y, m), min (r, g), min (c, y), min (g, b), min (m, c), min (b, r). Each calculation term possesses the characteristics of a first-order term. For instance, if W is a constant, since r=W and g=b0 hold for red, y=m=W and c=0 are obtained. Then, min (y, m)=W holds, and the other five terms are all zero. The magnitude of the constant W depends on the brightness of the color of the pixel, and since min (y, m)=W holds, min (y, m) is a first-order term for chrome. Accordingly, for red, min (y, m) is the only effective first-order term. Similarly, all the other calculation terms in the form of the comparison-result data are first-order function for chroma in the hue where they are effective. The only effective first-order term is min (c, y) for green, min (m, c) for blue, min (g, b) for cyan, min (b, r) for magenta, and min (r, g) for yellow.

FIG. 22A to FIG. 22B respectively show relations between the six hues and inter-hue areas and effective calculation terms obtained from the polynomial arithmetic unit 3b in FIG. 18. Thus, if the coefficient generator 5c changes coefficients for a calculation term effective for a hue or an inter-hue area to be adjusted, only the target hue can be adjusted, and the inter-hue areas can also be corrected. Further, if coefficients in the calculation coefficient generator 15 in the polynomial arithmetic unit 3b are changed, part or the inter-hue area where a calculation term in the inter-hue area is effective can be changed without giving any influence to the other hues.

An example of coefficients generated at the coefficient generator 5 in Embodiment 9 is U (Eij), as in Embodiment 1. If the coefficients U (Eij) are all zero this represents the case where no color conversion is executed. In the formula (18), if, of the coefficients U (Fij) in formula (18), by setting the coefficients for second-order calculation terms which are product terms to be all zero, and by performing correction by means of the coefficients for fraction terms and calculation terms in the form of comparison-result data, both of which are first-order calculation terms, it is possible to linearly adjust only the hues or inter-hue areas. By determining the coefficients which relate to the hue or inter-hue are which it is desired to change, and setting other coefficient zero, it is possible to adjust only the target hue or inter-hue area.

The first-order fraction terms T4=Q1*Q2/(Q1+Q2), T2=P1*P2/(P1+P2) in Embodiments 1 to 8, and the first-order term in the form of comparison-result data T7=min (Q1, Q2), T6=min (P1, P2) relate to the same hue. However, in the case of the calculation terms in the form of comparison-result data in Embodiment 9, it is possible to obtain a first-order term which is effective only to the specific hue, by the selection of the minimum value among the hue data, and the processing is simpler and quicker than if the calculation terms are obtained by multiplication and division.

As apparent from the foregoing, by changing the coefficients of the product terms and the first-order terms in the form of comparison-result data, relating to specific hues, it is possible to adjust only the target hue among the six hues of red, blue, green, yellow, cyan and magenta, without affecting other hues, and by changing the coefficients relating to the first-order term relating to the inter-hue areas, it is possible to correct the six inter-hue areas or red-yellow, yellow-green, green-cyan, cyan-blue, blue-magenta, and magenta-red independently. Accordingly, it is possible to obtain a color conversion device or color conversion method with which the conversion characteristics can be flexibly varied, and which does not require a large-capacity memory.

In Embodiment 9 described above, the hue data r, g and b, y, m and c, and the maximum and minimum values β and α were calculated based on the inputted image data R, G and B so as to obtain the calculation terms for the respective hues, and after the matrix calculation, the image data R, C and B were obtained. However, after the outputted image data are obtained, the data R, G and B may be converted into complementary color data C, M and Y. After obtaining the six hue data, and the maximum value β and the minimum value α, the calculation terms shown in FIG. 22 may be calculated, and the coefficients in the matrix calculation can be varied against the hues and inter-hue areas. In this case, the same effects will be realized.

Furthermore, in Embodiment 9 described above, the processing was performed by the hardware configuration of FIG. 18. Needless to say, the same processing can be performed by software in the color conversion device, and in this case, the same effects as those of Embodiment 9 will be provided.

Embodiment 10

In Embodiment 9, the hue data r, g and b, y, m and c, and the maximum and minimum values β and α were calculated based on the inputted image data R, G and B so as to obtain the calculation terms for the respective hues, and after the matrix calculation, the image data R, G and B were obtained. But the image data R, G and B may first be converted into complementary color data C, M and Y, and then color conversion may be executed by inputting the complementary color data C, M and Y.

Figure 23:
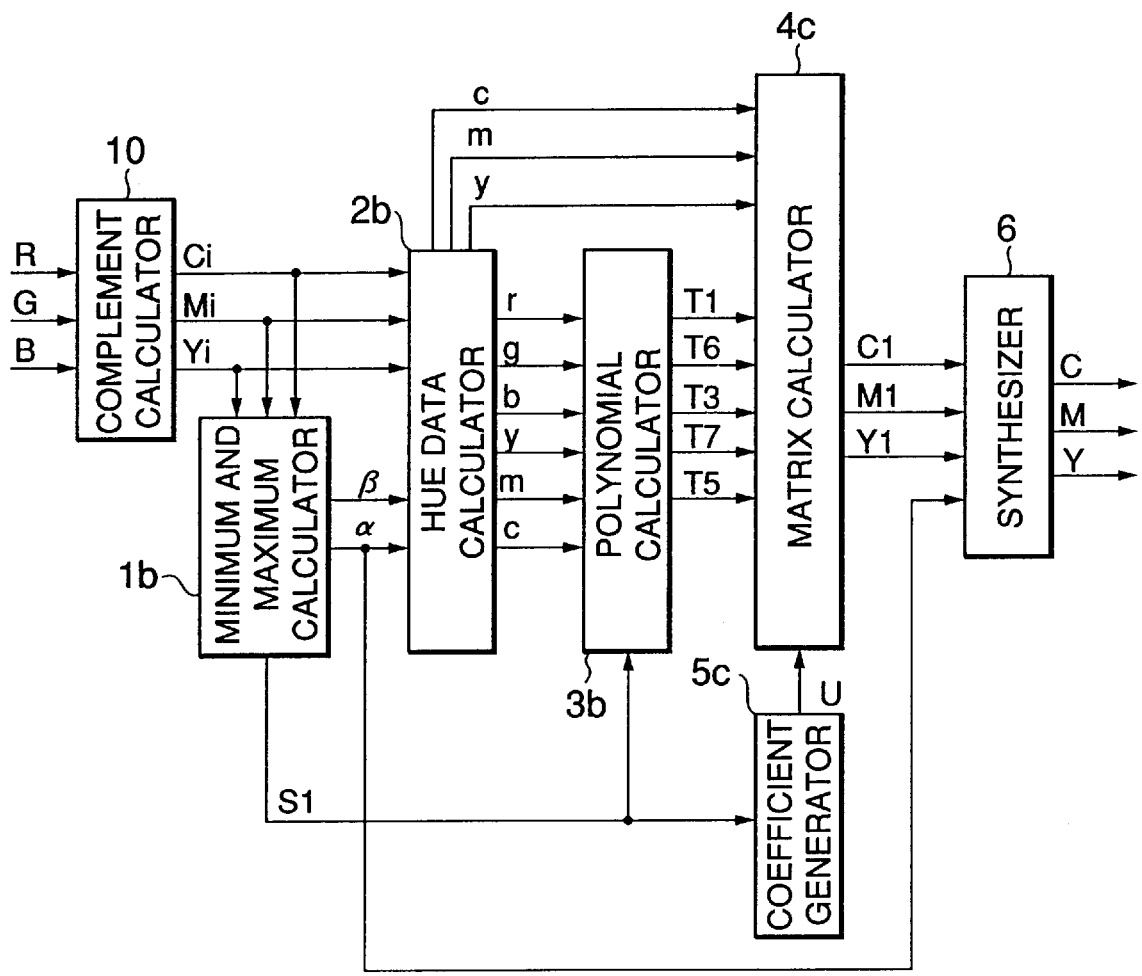
FIG. 23 is a block diagram showing an example of configuration of a color conversion device of Embodiment 10 of the present invention.

FIG. 23 is a block diagram showing an example of configuration of a color conversion device and a color conversion method of Embodiment 10 of the present invention. In the drawing, reference numerals 1b, 2b, 10, and 6 denote the same members as those described with reference to FIG. 11 in connection with Embodiment 2. Reference numerals 3b, 4c and 5c denotes the same members as those described with reference t6 FIG. 18 in connection with Embodiment 9.

Next, the operation will be described. The complement calculator 10 receives the image data R, C and B, and outputs complementary color data Ci, Mi and Yi obtained by determining 1's complements. The minimum and maximum calculator 1b outputs the maximum and minimum values β and α or each of these complementary color data and an identification code S1 for indicating, among the six hue data, data which are zero.

Then, the hue data calculator 2b receives the complementary color data Ci, Mi and Yi and the maximum and minimum values β and α from the minimum and maximum calculator 1b, performs subtraction of r=β−Ci, g=β−Mi, b=β−Yi, y=Yi−α, m=Mi−α, and c=Ci−α, and outputs six hue data r, g, b, y, m and c. Here, at least two among these six hue data are zero. The identification code S1 outputted from the minimum and maximum calculator 1b is used for indicating, among the six hue data, data which are zero. The value of the identification code depends on which of Ci, Mi and Yi the maximum and minimum values β and α are. Relations between the data among the six hue data which are zero, and the values of the identification code are the same as those in Embodiment 1, and thus further explanation will be omitted.

Then, the six hue data r, g, b, y, mi and c outputted from the hue data calculator 2b are sent to the polynomial arithmetic unit 3b, and the hue data c, m and y are also sent to the matrix calculator 4c. The polynomial arithmetic unit 3b also receives the identification code S1 outputted from the minimum and maximum calculator 1b, and performs calculation by selecting, from the hue data, two data Q1 and Q2 which are not zero, and from the hue data y, m and c, two data P1 and P2 which are not of a value zero. This operation is identical to that described with reference to FIG. 19 in connection with Embodiment 9, so that detailed description thereof is omitted.

The output of the polynomial arithmetic unit 3b is supplied to the matrix calculator 4c, and the coefficient generator 5c generates the calculation coefficients U (Fij) and fixed coefficients U (Eij) for the polynomial data based on the identification code S1, and sends the same to the matrix calculator 4c. The matrix calculator 4c receives the hue data c, m and y from the hue data calculator 2b, the polynomial data T1, T3, T5, T6, and T7 from the polynomial arithmetic unit 3b and the coefficients U from the coefficient generator 5c, and outputs the results of calculation according to the following formula (24) as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T1 \\ T6 \\ T3 \\ T7 \\ T5 \end{bmatrix} \quad (24)$$

For (Eij), i=1 to 3 and j=1 to 3, and for (Fij), i=1 to 3 and j=1 to 5.

The operation at the matrix calculator 4c is similar to that described with reference to FIG. 20 in connection with Embodiment 9, but the inputted hue data is c (or m, y) and C1 (or M1, Y1) is calculated and outputted. The detailed description thereof is therefore omitted.

The synthesizer 6 receives the image data C1, M1 and Y1 from the matrix calculator 4c and the minimum value α outputted from the minimum and maximum calculator 1b representing the achromatic data, performs addition, and outputs image data C, M and Y. The equation used for obtaining the image data color-converted by the color-conversion method of FIG. 23 is therefore given by the following formula (10).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \end{bmatrix} + \begin{bmatrix} \alpha \\ \alpha \\ \alpha \end{bmatrix} \quad (10)$$

Here, for (Eij), i=1 to 3 and j=1 to 3, and for (Fij), i=1 to 3 and j=1 to 18.

The difference between the number of calculation terms in the formula (10) and the number of calculation terms in FIG. 23 is that FIG. 23 shows a method of calculation for each pixel excluding data resulting in calculation terms which are of a value zero, while the formula (10) represents a general formula for a set of pixels. In other words, eighteen polynomial data for one pixel of the formula (10) can be reduced to five effective data, and this reduction is achieved by exploiting a characteristic of the hue data. The combination of effective data is changed according to image data of the target pixel. For all image data, all the polynomial data can be effective.

The calculation terms output from the polynomial arithmetic unit based on the formula (10) are identical to those of the formula (9) in Embodiment 9. Thus, relations between the six hues and inter-hue areas, and effective calculation terms are the same as those shown in FIG. 22A and FIG. 22B. Therefore, as in Embodiment 9, in the coefficient generator 5c, by changing the coefficients for an effective calculation term for a hue or for an inter-hue area to be adjusted, only the target hue can be adjusted. In addition, by changing the coefficients in the calculation coefficient generator 15 in the polynomial arithmetic unit 3b, part of the inter-hue area where a calculation term in the inter-hue area is effective can be changed without giving any influence to the other hues.

Here, an example of coefficients generated by the coefficient generator 5 of Embodiment 10 are the coefficients U (Eij) of the formula (17), as in Embodiment 1. If the coefficients U (Fij) are all zero, no color conversion is executed. Also, if those of the coefficients U (Fij) of the formula (18) which relate to the second-order calculation terms which are product terms are all zero, and correction is performed based on the coefficients for a fraction term and a calculation term in the form of comparison-result data, which are first-order calculation terms. Accordingly, only a hue or an inter-hue area can be linearly adjusted. By setting coefficients relating to a first-order calculation term for a hue or an inter-hue area to be changed and setting other coefficients to zero, only the target hue or inter-hue area can be adjusted.

As apparent from the foregoing, by changing the coefficients of the product terms and the first-order terms in the form of the comparison-result data based on the hue data, relating to specific hues, it is possible to adjust only the target hue among the six hues of red, blue, green, yellow, cyan and magenta, without influencing other hues, and by changing the coefficients relating to the first-order calculation term in the form or the comparison-result data based on the hue data, it is possible to correct the six inter-hue areas of red-yellow, yellow-green, green-cyan, cyan-blue, blue-magenta, and magenta-red.

Each of the foregoing product terms is a second-order calculation for chroma, and each of the fraction terms is a first-order calculation for chroma. Accordingly, by using both of the product terms and the first-order terms in the form of the comparison-result data, the non-linearity of an image-printing or the like can be corrected for chroma. Provided therefore is a color conversion device or a color conversion method, which is capable of flexibly changing a conversion characteristic and eliminates the necessity of a large-capacity memory.

Furthermore, in Embodiment 10 described above, the processing was performed by the hardware configuration of FIG. 23. Needless to say, the same processing can be performed by software in the color conversion device, and in this case, the same effects as those of Embodiment 10 will be provided.

Embodiment 11

In Embodiment 9, an example of configuration of the matrix calculator 4c is partly as shown in the block diagram of FIG. 20, and is configured as shown in Formula (9). It is possible to adopt, a configuration shown In FIG. 24 in which coefficients for the minimum value α which is achromatic data are generated in the coefficient generator, to adjust the achromatic component.

Figure 24:
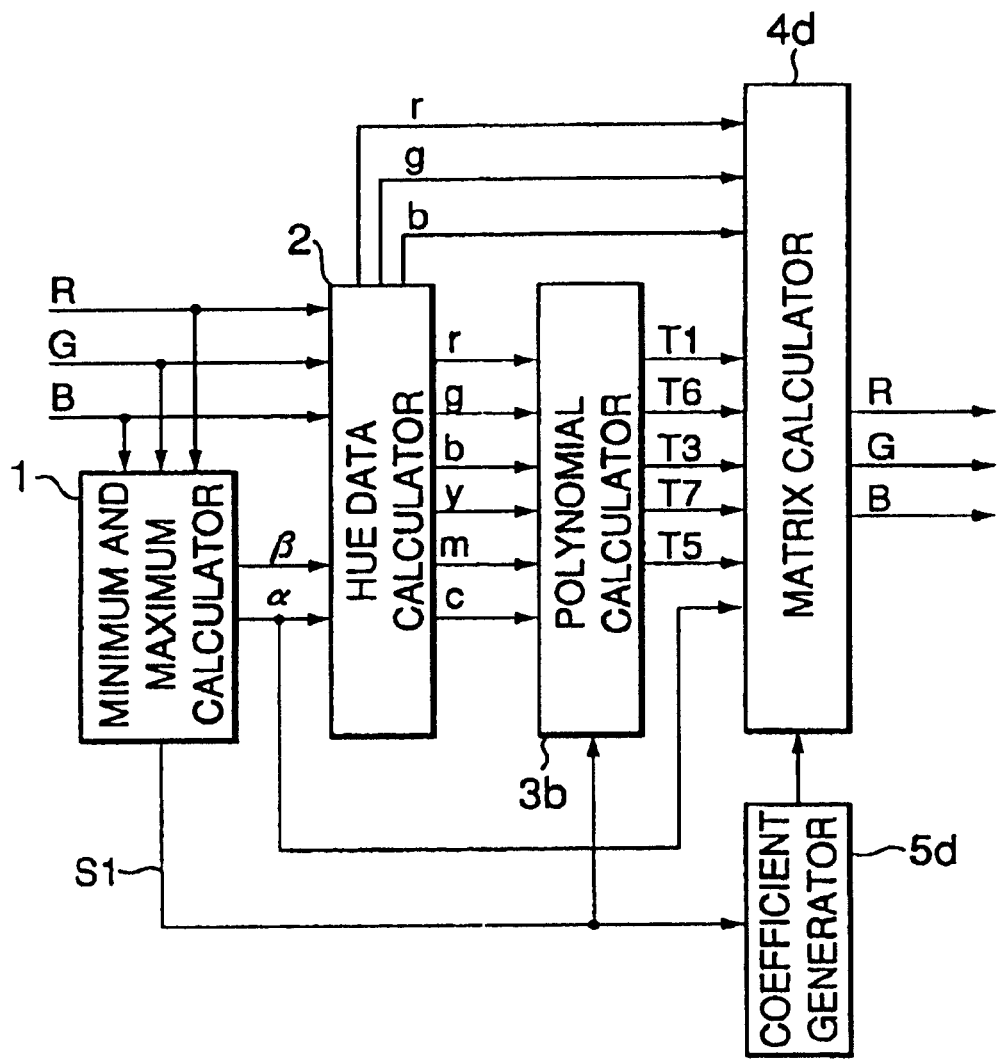
FIG. 24 is a block diagram showing an example of configuration of a color conversion device of Embodiment 11 of the present invention.

FIG. 24 is a block diagram showing an example of configuration of a color conversion device and a color conversion method of Embodiment 11 of the present invention. In the figure, reference numerals 1, 2 and 3b denote members identical to those described with reference to FIG. 18 in connection with Embodiment 9. Reference numeral 4d denotes a matrix calculator, 5d denotes a coefficient generator.

The operation will next be described. The determination of the maximum value β, the minimum value α, and the identification code S1 from the inputted data at the minimum and maximum calculator 1, the calculation of the six hue data at the hue data calculator 2, and the determination of the calculation term at the polynomial arithmetic unit 3b are identical to those of Embodiment 9, and detailed description thereof is therefore omitted.

The coefficient generator 5d in FIG. 24 generates the calculation coefficients U (Fij) and the fixed coefficients U (Eij) of the polynomial data based on the identification code S1 and sends them to the matrix calculator 4d. The matrix calculator 4d receives the hue data r, g, and b from the hue data calculator 2, the polynomial data T1, T3, T5, T6, and T7 from the polynomial arithmetic unit 3b, the minimum value α from the minimum and maximum calculator 1, and the coefficients U from the coefficient generator 5d, and performs calculation thereon. The equation used for the calculation is represented by the following formula (25), and the achromatic component is adjusted.

$$\begin{bmatrix} R \\ G \\ B \end{bmatrix} = (Eij) \begin{bmatrix} r \\ g \\ b \end{bmatrix} + (Fij) \begin{bmatrix} T1 \\ T6 \\ T3 \\ T7 \\ T5 \\ \alpha \end{bmatrix} \quad (25)$$

For (Eij), i=1 to 3 and j=1 to 3, and for (Fij), i=1 to 3 and j=1 to 6.

Figure 25:
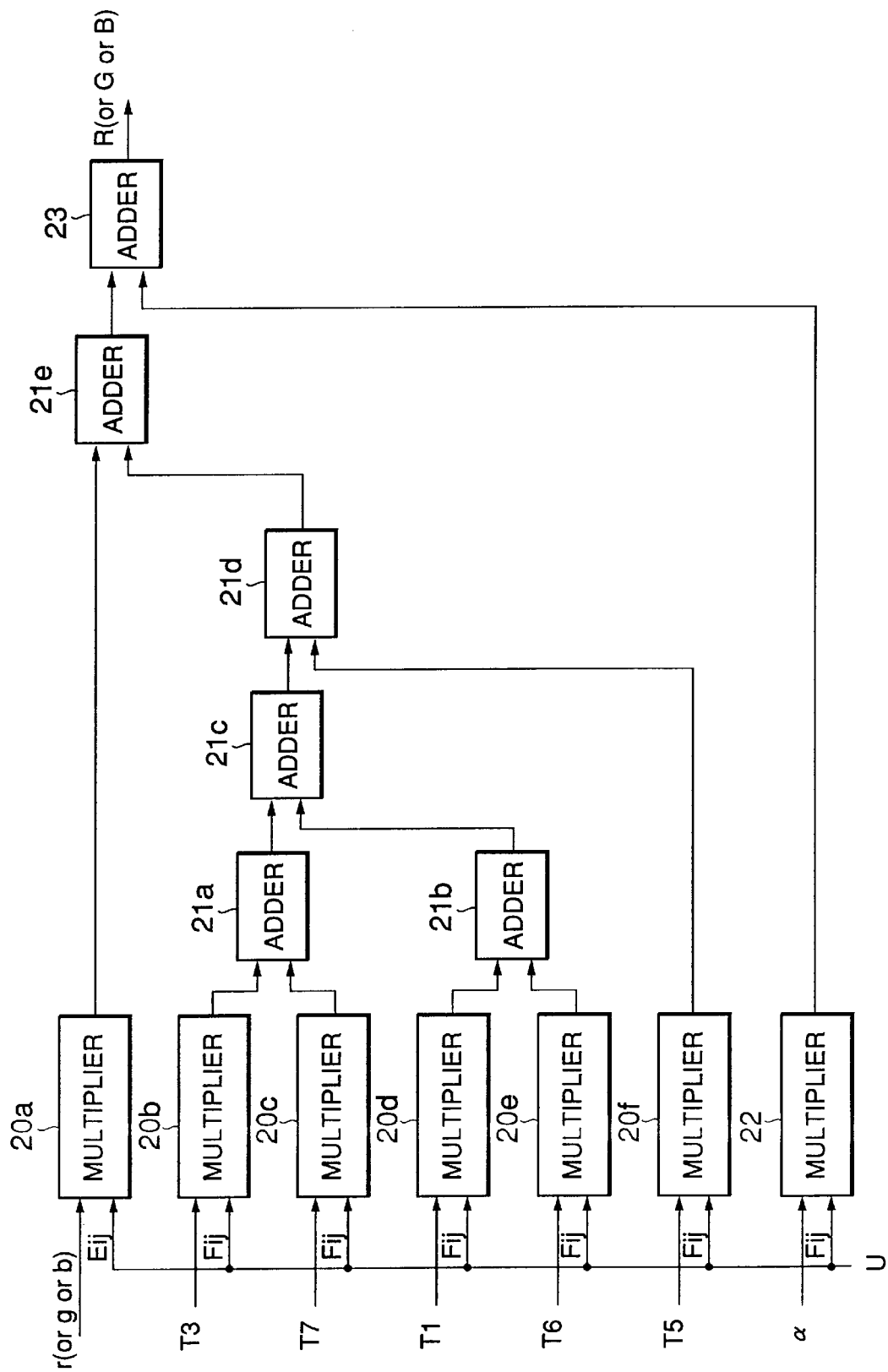
FIG. 25 is a diagram showing part of an example of configuration of a matrix calculator included in the color conversion device of Embodiment 11.

FIG. 25 is a block diagram showing an example of configuration of the matrix calculator 4d. In FIG. 25, reference numerals 20a to 20f and 21a to 21f denote members identical to those in the matrix calculator 4c of Embodiment 9. Reference numerals 22 and 23 denote members identical to those in the matrix calculator 4b described with reference to FIG. 13 in connection with Embodiment 3.

Next, the operation of the matrix calculator 4d in FIG. will be described. The multipliers 20a to 20f receives the hue data r, the polynomial data T1, T3, T5, T6, and T7 from the polynomial arithmetic unit 3b and the coefficients U (Eij) and U (Fij) from the coefficient generator 5d, and then output the products thereof. The adders 21a to 21e add the products and sums. These operations are identical to those of the matrix calculators 4 or 4c in the above embodiment. The multiplier 22 receives the minimum value a among the R, G and B data, from the minimum and maximum calculator 1 which corresponds to the achromatic component, and the coefficients U (Fij) from the coefficient generator 5d, and performs multiplication, and outputs the product to the adder 23, where the products are added to the output of the adder 21e, and the sum total is output as the output R of the image data R. In the example of FIG. 25, if the hue data r is replaced by g or b, the image data C or B is calculated.

The part of the coefficients (Eij) and (Fij) corresponding to the hue data r, g and b are used. In other words, if three configuration, each similar to that of FIG. 25, are used in parallel for the hue data r, g and b, matrix calculation can be performed at a higher speed.

The matrix calculator 4d performs calculation on the calculation terms, and the minimum value α which is the achromatic data, and adds the results to the hue data, to output the image data R, G, B. The equation for determining the image data is represented by the following formula (11).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (11)$$

For (Eij), i=1 to 3 and j=1 to 3, and for (Fij), i=1 to 3 and j=1 to 19.

The difference between the number of calculation terms in the formula (11) and the number of calculation terms in FIG. 24 is that, as in the above embodiments, FIG. 24 shows a method of calculation for each pixel excluding data resulting in calculation terms in the polynomial data arithmetic unit in FIG. 24 which are of a value zero, while the formula (11) represents a general formula for a set of pixels. In other words, nineteen polynomial data for one pixel of the formula (11) can be reduced to six effective data, and this reduction is achieved by exploiting a characteristic of the hue data. The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients of the product terms, the first-order terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

In Embodiment 11 described above, the image data R, G, B are obtained after the matrix calculation. As an alternative, the output image data R, G, B are first obtained, and R, G, B may be converted to C, M, Y. If the coefficients used in the matrix calculation can be changed for the respective hues, the inter-hue areas, and the minimum value α which is achromatic data, effects similar to those discussed above can be obtained.

Furthermore, also in Embodiment 11, the above described processing can be performed by software in the color conversion device, as in the above embodiments, and yet effects similar to those obtained by Embodiment 11 can be obtained.

Embodiment 12

Embodiment 10 was configured to add the hue data, the calculation terms, and the minimum value α which is achromatic data, as shown in Formula (10). As an alternative, the configuration may be such that coefficients for the minimum value α which is achromatic data is generated at the coefficient generator, as shown in FIG. 26, so that the achromatic component is thereby adjusted.

Figure 26:
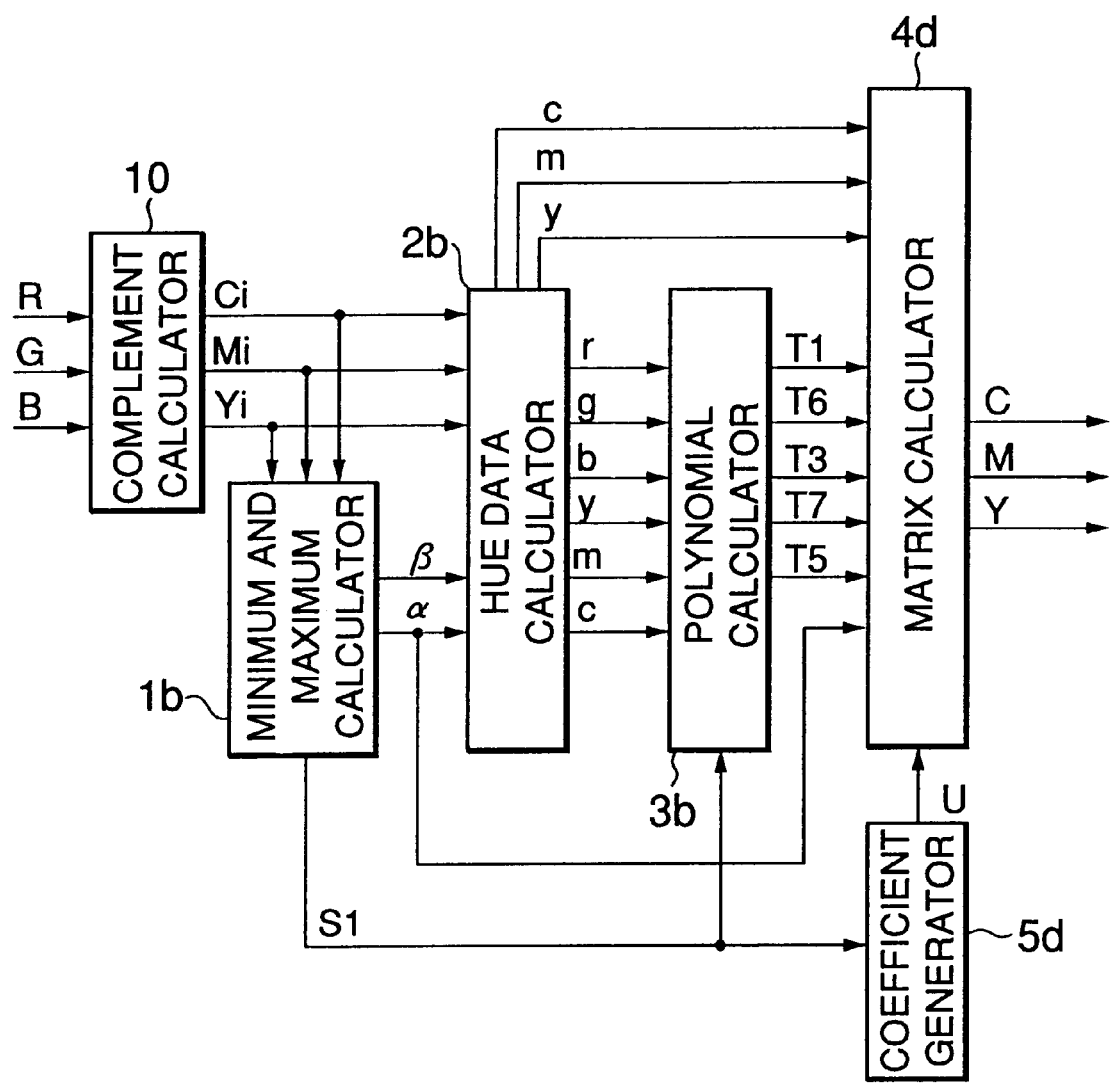
FIG. 26 is a block diagram showing an example of configuration of a color conversion device of Embodiment 12 of the present invention.

FIG. 26 is a block diagram showing an example of configuration of color conversion device and color conversion method according to Embodiment 12 of the invention. In the figure, reference numerals 10, 1b, 2b and 3b denote members identical to those described with reference to FIG. 23 in connection with Embodiment 10, and reference numerals 4d and 5d denote members identical to those described with reference to FIG. 24 in connection with Embodiment 11.

The operation will next be described. The image data R, G, B are input to the complement calculator 10 to obtain the complementary data Ci, Mi, Yi by the process of determining 1's complement. The determination of the maximum value β, the minimum value α and the identification code S1 at the minimum and maximum calculator 1b, the calculation of the six hue data at the hue data calculator 2b, and the determination of the calculation terms at the polynomial arithmetic unit 3b are identical to those in the case of the complementary data C, M, Y in Embodiment 10. The detailed description thereof are therefore omitted.

The coefficient generator 5d in FIG. 26 generates the calculation coefficients U (Fij) and the fixed coefficients U (Eij) of the polynomial data based on the identification code S1 and sends them to the matrix calculator 4d. The matrix calculator 4d receives the hue data c, m, and y from the hue data calculator 2b, the polynomial data T1, T3, T5, T6 and T7 from the polynomial arithmetic unit 3, the minimum value α from the minimum and maximum calculator 1, and the coefficients U from the coefficient generator 5d, and performs calculation thereon. The equation used for the calculation is represented by the following formula (26), and the achromatic component is adjusted.

$$\begin{bmatrix} C \\ M \\ Y \end{bmatrix} = (Eij) \begin{bmatrix} c \\ m \\ y \end{bmatrix} + (Fij) \begin{bmatrix} T1 \\ T6 \\ T3 \\ T7 \\ T5 \\ \alpha \end{bmatrix} \quad (26)$$

For (Eij), i=1 to 3 and j=1 to 3, and for (Fij), i=1 to 3 and j=1 to 6.

The operation at the matrix calculator 4d is similar to that described with reference to FIG. 25 in connection with Embodiment 11, but the inputted hue data is c (or m, y) and C (or M, Y) is calculated and outputted. The detailed description thereof is therefore omitted.

The matrix calculator 4d performs calculation on the calculation terms, and the minimum value α which is the achromatic data, and adds the results to the hue data, to output the image data C, M, Y. The equation for determining the image data is represented by the following formula (12).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ \alpha \end{bmatrix} \quad (12)$$

For (Eij), i=1 to 3 and j=1 to 3, and for (Fij), i=1 to 3 and j=1 to 19.

The difference between the number of calculation terms in the formula (12) and the number of calculation terms In FIG. 26 is that, as in the above embodiments, FIG. 26 shows a method of calculation for each pixel excluding data resulting in calculation terms in the polynomial data arithmetic unit which are of a value zero, while the formula (12) represents a general formula for a set of pixels. In other words, nineteen polynomial data for one pixel of the formula (12) can be reduced to six effective data, and this reduction is achieved by exploiting a characteristic of the hue data. The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients of the product terms, the first-order calculation terms in the form of comparison-result data based on the hue data relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

Furthermore, also in Embodiment 12, the above described processing can be performed by software in the color conversion device, as in the above-described Embodiment, and yet effects similar to those obtained by Embodiment 12 can be obtained.

Embodiment 13

In Embodiments 9 to 12, an example of the configuration of the polynomial arithmetic unit 3b is assumed to be as shown in the block diagram of FIG. 19, and the polynomial data shown in formulae (9) to (12) are calculated and outputted. As an alternative, the polynomial arithmetic unit 3b may be configured as shown in FIG. 27 to calculate polynomial data.

Figure 27:
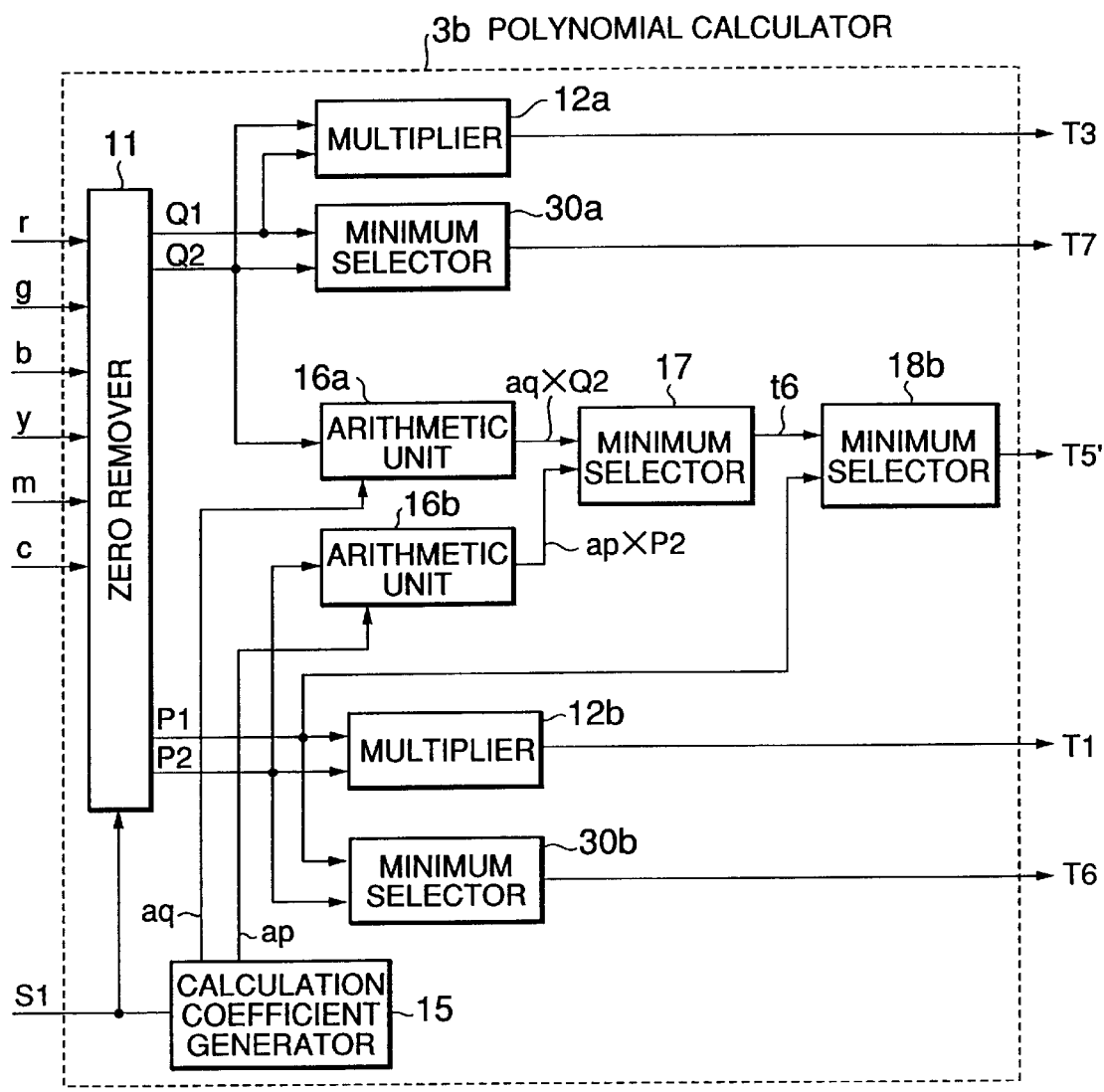
FIG. 27 is a block diagram showing another example of configuration of a polynomial arithmetic unit included in a color conversion device of Embodiment 13 of the present invention.
Figure 29:
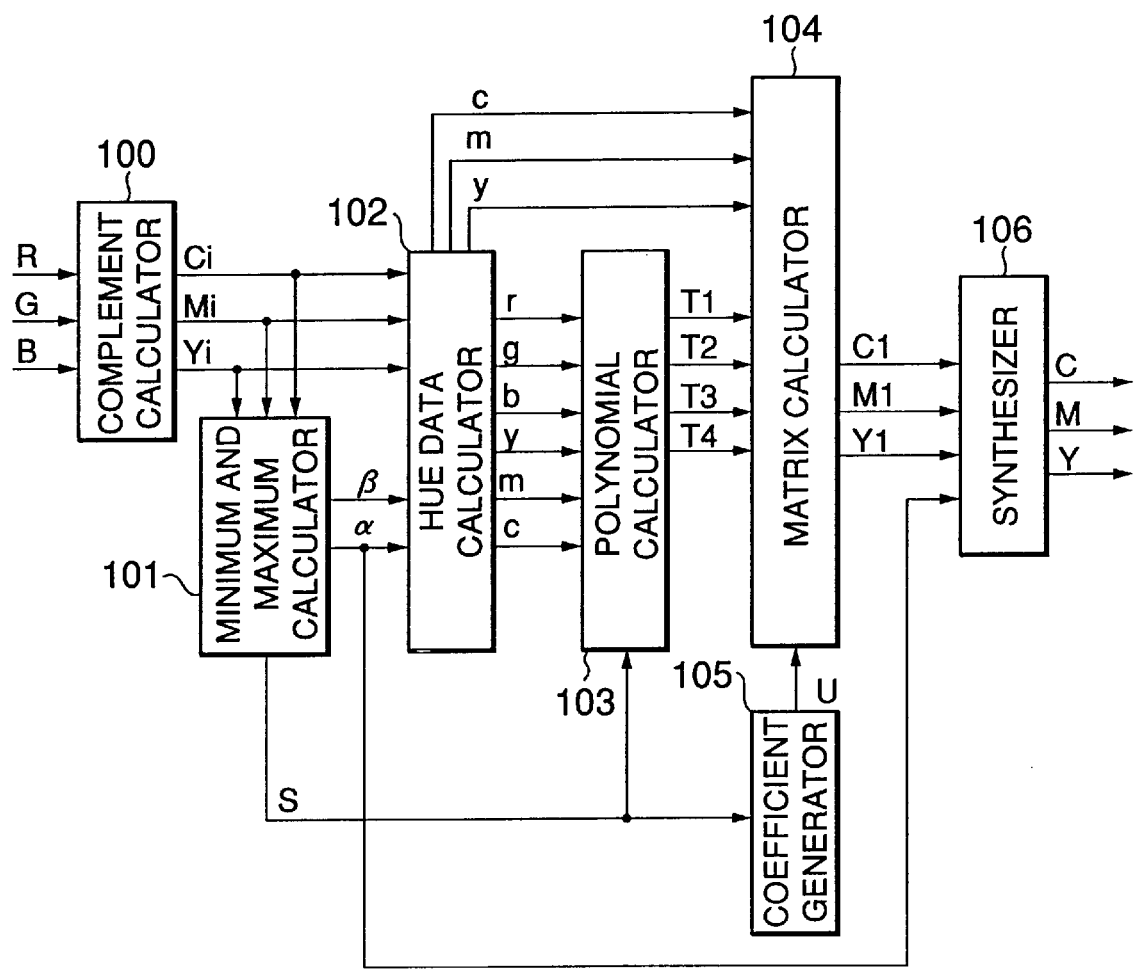
FIG. 29 is a block diagram showing an example of configuration of a conventional color conversion device.
Figure 30A:
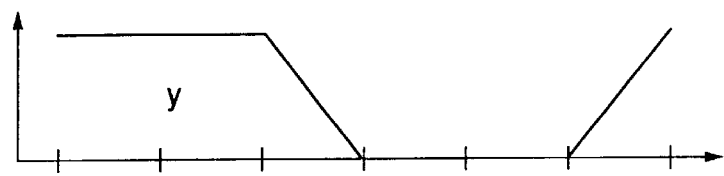
FIG. 30A to FIG. 30F are diagrams schematically showing the relationship between six hues and hue data in the conventional color conversion device.
Figure 30B:
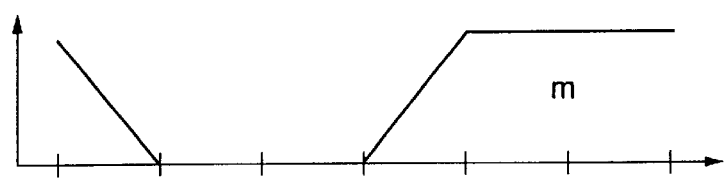
Figure 30C:
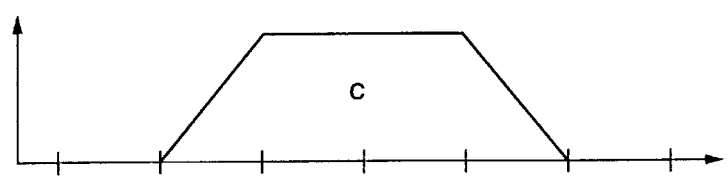
Figure 30D:
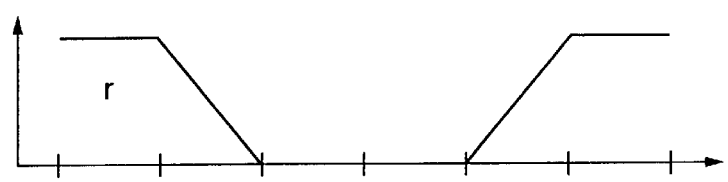
Figure 30E:
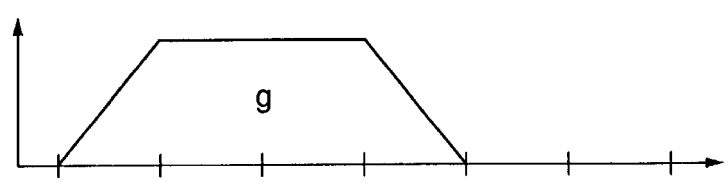
Figure 30F:
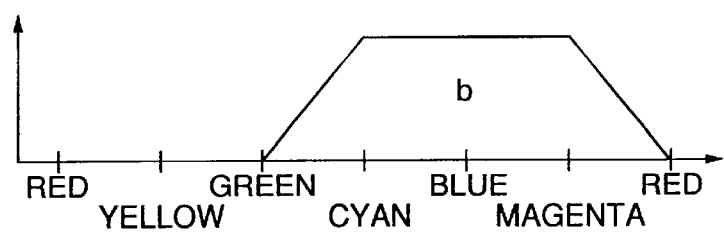
Figure 31A:
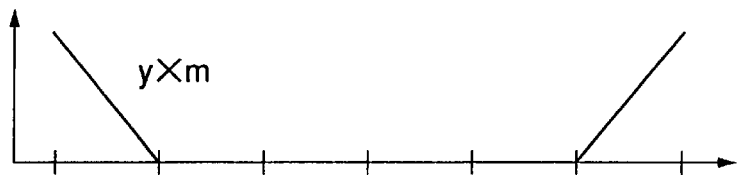
FIG. 31A to FIG. 31F are diagrams schematically showing the relationship between a calculation term and a hue in a matrix calculator included in the conventional color conversion device.
Figure 31B:
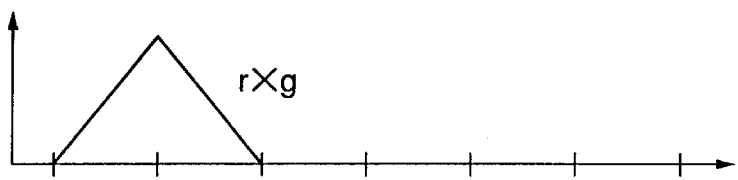
Figure 31C:
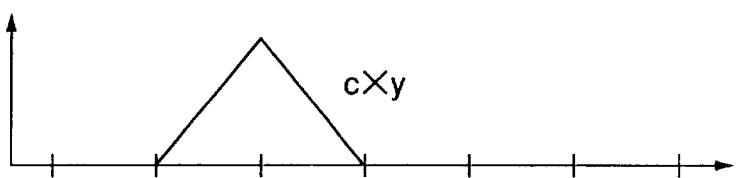
Figure 31D:
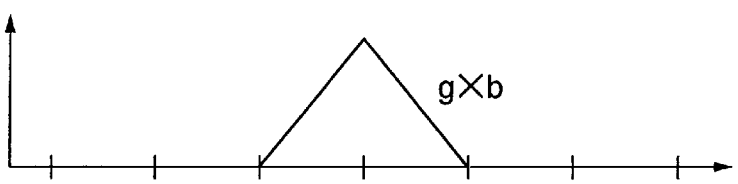
Figure 31E:
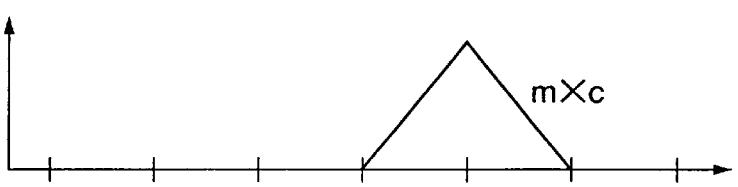
Figure 31F:
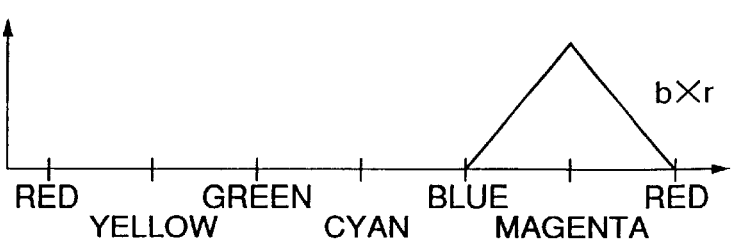

FIG. 27 is a block diagram showing another example of configuration of the polynomial arithmetic unit 3b. In the figure, reference numerals 11, 12a, 12b, and 15 to 17 denote members identical to those or the polynomial arithmetic unit described with reference to FIG. 19 in connection with Embodiment 9. Reference numeral 18b denotes a minimum selector identical to that described with reference to FIG. 15 in connection with Embodiment 5.

The operation of the polynomial arithmetic unit of FIG. 27 will next be described. The operation of the zero remover 11, the operation of the multipliers 12a and 12b to determine T3=Q1*Q2, T1=P1*P2, and the operation of the minimum selectors 30a and 30b to determine T7=min (Q1, Q2), T6=min (P1, P2), and the operations of the calculation coefficient generator 15, the arithmetic units 16a and 16b, and the minimum selector 17 up to outputting t6=min (aq*Q2, ap*P2) are is identical to those described with reference to FIG. 19 in connection with the above embodiment, and detailed description thereof is therefore omitted.

The output t6=min (aq*Q2, ap*P2) from the minimum selector 17 is outputted to the minimum selector 18b, to which the output data P1 from the zero remover 11 is also inputted, and the minimum value T5'=min (P1, min (aq*Q2, ap*P2)) between P1 and t6=min (aq*Q2, ap*P2)) is outputted. Accordingly, the polynomial data T1, T3, T6, T7 and T5' are outputs of the polynomial arithmetic unit of FIG. 15. The outputs of the polynomial arithmetic unit are sent to the matrix calculator 4c or 4d.

According to the polynomial arithmetic unit 3b in FIG. 27, the equation used for obtaining the image data R, G, B color-converted by the color-conversion method of FIG. 18 in Embodiment 9 is therefore given by the following formula (13).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \quad (13)$$

Here, for (Eij), i=1 to 3 and j=1 to 3, and for (Fij), i=1 to 3 and j=1 to 18, and hry=min (aq1*g, ap1*m),
hrm=min (aq2*b, ap2*y),
hgy=min (aq3*r, ap3*c),
hgc=min (aq4*b, ap4*y), hbm=min (aq5*r, ap5*c), and
hbc=min (aq6*g, ap6*m),
and aq1 to aq6 and ap1 to ap6 indicate calculation coefficients generated by the calculation coefficient generator 15 of FIG. 27.

The difference between the number of calculation terms in the formula (13) and the number of calculation terms in FIG. 27 is that FIG. 27 shows a method of calculation for each pixel excluding data resulting in calculation terms which are of a value zero, while the formula (13) represents a general formula for a set of pixels. In other words, eighteen polynomial data for one pixel of the formula (13) can be reduced to five effective data, and this reduction is achieved by exploiting a characteristic of the hue data. The combination of effective data is changed according to image data of the target pixel. For all image data, all the polynomial data can be effective.

The relations between the six hues and first-order calculation terms in the form of the comparison-result data, min (y, hry), min (y, hgy), min (c, hgc), min (c, hbc), min (m, hbm) and min (in, hrm) is identical to those described with reference to FIG. 16A to FIG. 16F in connection with Embodiment 5. It can be understood that the first-order calculation terms in the form of the comparison-result data relate to changes in the six inter-hue areas of red-green, yellow-green, green-cyan, cyan-blue, blue-magenta, and magenta-red. In other words, only min (y, hry) is an effective first-order calculation term. Similarly, only min (y, hgy) is an effective first-order calculation term for yellow-green; min (c, hgc) for green-cyan; min (c, hbc) for cyan-blue; min (m, hbc) for blue-magenta; and min (m, hrm) for magenta-red.

FIG. 28A to FIG. 28B respectively show relations between the six hues and inter-hue areas and effective calculation terms. Thus, if the coefficient generator changes coefficients for a calculation term effective for a hue or an inter-hue area to be adjusted, only the target hue can be adjusted.

Further, if coefficients in the calculation coefficient generator 15 in the polynomial arithmetic unit 3b are changed, part of the inter-hue area where a calculation term in the inter-hue area is effective can be changed without giving any influence to the other hues.

As apparent from the foregoing, by changing the coefficients of the product terms and the first-order calculation terms in the form of comparison-result data based on the hue data, relating to specific hues, it is possible to adjust only the target hue among the six hues of red, blue, green, yellow, cyan and magenta, without influencing other hues, and by changing the coefficients relating to the first-order calculation term in the form of the comparison-result data based on the hue data, it is possible to correct the six inter-hue areas of red-yellow, yellow-green, green-cyan, cyan-blue, blue-magenta, and magenta-red.

Provided therefore is a color conversion device or a color conversion method, which is capable of flexibly changing a conversion characteristic and eliminates the necessity of a large-capacity memory.

Furthermore, in Embodiment 13 described above, the processing was performed by the hardware configuration or FIG. 27. Needless to say, the same processing can be performed by software in the color conversion device, and in this case, the same effects as those of Embodiment 13 will be provided.

Embodiment 14

According to the polynomial arithmetic unit 3b described with reference to FIG. 27 in connection with Embodiment 13, the equation for determining the color-converted image data C, M, Y by the method described with reference to FIG. 23 in connection with Embodiment 10 is given by the following formula (14).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \end{bmatrix} + \begin{bmatrix} \alpha \\ \alpha \\ \alpha \end{bmatrix} \qquad (14)$$

Here, for (Eij), i=1 to 3 and j=1 to 3, and for (Fij), i=1 to 3 and j=1 to 18, and hry=min (aq1*g, ap1*m), hrm=min (aq2*b, ap2*y), hgy=min (aq3*r, ap3*c), hgc=min (aq4*b, ap4*y), hbm=min (aq5*r, ap5*c), and hbc=min (aq6*g, ap6*m), and aq1 to aq6 and ap1 to ap6 indicate calculation coefficients generated by the calculation coefficient generator 15 of FIG. 27.

The difference between the number of calculation terms in the formula (14) and the number of calculation terms in FIG. 27 is that FIG. 27 shows a method of calculation for each pixel excluding data resulting in calculation terms which are of a value is zero, while the formula (14) represents a general formula for a set of pixels. In other words, eighteen polynomial data for one pixel of the formula (14) can be reduced to five effective data, and this reduction is achieved by exploiting a characteristic of the hue data. Moreover, the combination of effective data is changed according to image data of the target pixel. For all image data, all the polynomial data can be effective.

The calculation terms output from the polynomial arithmetic unit based on the formula (14) are identical to those of the formula (13) in Embodiment 13. Thus, relations between the six hues and inter-hue areas and effective calculation terms are the same as those shown in FIG. 28A and FIG. 28B. Therefore, as in Embodiment 13, in the coefficient generator, by changing the coefficients for an effective calculation term. For a hue or for an inter-hue area to be adjusted, only the target hue can be adjusted. In addition, by changing the coefficients in the calculation coefficient generator 15 in the polynomial arithmetic unit 3b, part of the inter-hue area where a calculation term in the inter-hue area is effective can be changed without giving any influence to the other hues.

As apparent from the foregoing, by changing the coefficients of the product terms and the calculation terms in the form of comparison-result data based on the hue data, relating to specific hues, it is possible to adjust only the target hue among the six hues of red, blue, green, yellow, cyan and magenta, without influencing other hues, and by changing the coefficients relating to the first-order calculation term in the form of the comparison-result data based on the hue data, it is possible to correct the six inter-hue areas of red-yellow, yellow-green, green-cyan, cyan-blue, blue-magenta, and magenta-red.

Provided therefore is a color conversion device or a color conversion method, which is capable of flexibly changing a conversion characteristic and eliminates the necessity of a large-capacity memory.

Embodiment 15

According to the polynomial arithmetic unit 3b described with reference to FIG. 27 in connection with Embodiment 13, the equation For determining the color-converted image data R, G, B by the method described with reference to FIG. 24 in connection with Embodiment 11 is given by the Following formula (15).

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (15)$$

For (Eij), i=1 to 3 and j=1 to 3, and for (Fij), i=1 to 3 and j=1 to 19.

The difference between the number of calculation terms in the formula (15) and the number of calculation terms in FIG. 27 is that FIG. 27 shows a method of calculation for each pixel excluding data resulting in calculation terms in the polynomial data arithmetic unit which are of a value zero, while the formula (15) represents a general formula for a set of pixels. In other words, nineteen polynomial data for one pixel of the formula (15) can be reduced to six effective data, and this reduction is achieved by exploiting a characteristic of the hue data. Moreover, the combination of effective data is changed according to image data of the target pixel. For all image data, all the polynomial data can be effective.

As apparent from the foregoing, by changing the coefficients of the product terms, the calculation terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

Embodiment 16

According to the polynomial arithmetic unit 3b described with reference to FIG. 27 in connection with Embodiment 13, the equation for determining the color-converted image data C, M, Y by the method described with reference to FIG. 26 in connection with Embodiment 12 is given by the following formula (16).

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ \alpha \end{bmatrix} \quad (16)$$

For (Eij), i=1 to 3 and j=1 to 3, and for (Fij), i=1 to 3 and j=1 to 19.

The difference between the number of calculation terms in the formula (16) and the number of calculation terms in FIG. 27 is that FIG. 27 shows a method of calculation for each pixel excluding data resulting in calculation terms in the polynomial data arithmetic unit which are of a value zero, while the formula (16) represents a general formula for a set of pixels. In other words, nineteen polynomial data for one pixel of the formula (16) can be reduced to six effective data, and this reduction is achieved by exploiting a characteristic or the hue data. Moreover, the combination of effective data is changed according to image data of the target pixel. For all image data, all the polynomial data can be effective.

As apparent from the foregoing, by changing the coefficients of the product terms, and the calculation terms in the form of comparison-result data based on the hue data, relating to specific hues, and the first-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components, and choose between a standard black, reddish black, bluish black and the like.

What is claimed is:

1. A method of converting image data having a first set of color data into a second set of color data comprising:

providing predetermined matrix coefficients;

generating a plurality of calculation terms, each of which is substantially effective for only one of a plurality of independent color regions based on the image data, wherein said independent color regions are inter-hue regions between adjacent hues of red, green, blue, cyan, magenta and yellow; and performing a matrix calculation using the predetermined matrix coefficients and the calculation terms to produce the second set of color data.

2. The method according to claim 1, wherein image data is at least one of stationary image data and motion video data.

3. The method according claim 1, further comprising:
generating a calculation term, which is effective for at least one of a plurality of hues.

4. The method according to claim 1, further comprising
calculating a maximum value and a minimum value of the image data for each pixel; and
using at least one of said maximum and minimum values to determine the predetermined matrix coefficients.

5. The method according to claim 1, wherein the first set of color data is R, G, B and the second set of color data is R, G, B.

6. The method according to claim 1, wherein the first set of color data is R, G, B and the second set of co or data is Y, M, C.

7. The method according to claim 6, further comprising:
generating complementary color data by determining 1's complements of the first set of color data.

8. The method according to claim 1, wherein the first set of color data is Y, M, C and the second set of color data is Y, M, C.

9. The method according to claim 1, wherein the first set of color data is Y, M, C and the second set of color data is R, G, B.

10. The method according to claim 1, further comprising:
calculating hue data of the first set of color data, and wherein the calculation terms are based on two or more of the hue data.

11. The method according to claim 10, generating a plurality of calculation terms comprises:
multiplying the hue data by calculation coefficients;
determining a first minimum value of the results of the multiplication; and
determining a second minimum value of said first minimum value and one of the hue data, wherein said second minimum value is used as each of said calculation terms.

12. The method according to claim 10, further comprising:
calculating a maximum value and a minimum value of the first set of color data; and
determining the hue data based on the first set of color data and the maximum and minimum values.

13. The method according to claim 12, wherein said minimum value is used in the matrix calculation.

14. The method according to claim 12, wherein said minimum value is added to a result of the matrix calculation.

15. A color conversion device for converting image data having a first set of color data into a second set of color data comprising:
a coefficient generator that provides predetermined matrix coefficients;
a calculator that generates a plurality of calculation terms, each of which is substantially effective for only one of a plurality of independent color regions based on the image data, wherein said independent color regions are inter-hue regions between adjacent hues of red, green, blue, cyan, magenta and yellow; and
a matrix calculator that performs a matrix calculation using predetermined matrix coefficients and the calculation terms to produce the second set of color data.

16. The color conversion device according to claim 15, wherein image data is at least one of stationary image data and motion video data.

17. The color conversion device according to claim 15, further comprising
a minimum and maximum calculator for calculating a maximum value and a minimum value of the image data for each pixel, wherein at least one of said maximum and minimum value is used to determine the predetermined matrix coefficients.

18. The color conversion device according to claim 15, wherein the first set of color data is R, G, B and the second set of color data is R, G, B.

19. The color conversion device according to claim 15, wherein the first set of color data is R, G, B and the second set of color data is Y, M, C.

20. The color conversion device according to claim 19, further comprising:
a complement generator that generates complementary color data by determining 1's complements of the first set of color data.

21. The color conversion device according to claim 15, wherein the first set of color data is Y, M, C and the second set of color data is Y, M, C.

22. The color conversion device according to claim 15, wherein the first set of color data is Y, M, C and the second set of color data is R, G, B.

23. The color conversion device according to claim 15, further comprising:
a hue data calculator that calculates hue data of the first set of color data, and wherein the calculation terms are based on two or more of the hue data.

24. The color conversion device according to claim 23, wherein the calculator comprises:
multipliers that multiply the hue data by calculation coefficients;
a first minimum value selector for determining a first minimum value of the results of the multiplication by said multipliers; and
a second minimum value selector for determining a second minimum value of said first minimum value and one of the hue data, wherein said second minimum value is used as each of said calculation terms.

25. The color conversion device according to claim 23, further comprising:
a maximum and minimum calculator that calculates a maximum value and a minimum value of the first set of color data, wherein said hue data calculator determines the hue data base on the first set of color data and the maximum and minimum values.

26. The color conversion device according to claim 25, wherein said minimum value is used in the matrix calculation.

27. The color conversion device according to claim 25, wherein said minimum value is added to a result of the matrix calculation.

28. A method of converting a first color data into a second color data, the method comprising:
calculating a plurality of hue data representing hue of the first color data;
providing calculation coefficients for designating an area in one of a plurality of inter-hue regions, wherein said inter-hue regions are between adjacent hues of red, green, blue, cyan, magenta and yellow;
generating calculation terms, each of which is substantially effective for one of the inter-hue regions based on the hue data and the calculation coefficients, wherein the calculation term has a peak value in the area designated by the calculation coefficients;

providing predetermined matrix coefficients; and performing a matrix calculation using the matrix coefficients and the calculation terms to produce the second color data.

29. The method according to claim 28, wherein the hue data includes six hue data r, g, b, y, m and c, and when the first color data is represented by Ri, Gi and Bi, and a minimum value and maximum value of the first color data are represented by $\alpha$ and $\beta$, the six hue data are calculated by the following equations:

$$r=Ri-\alpha,\ g=Gi-\alpha,\ b=Bi-\alpha,\ y=\beta-Bi,\ m=\beta-Gi,\ c=\beta-Ri.$$

30. The method according to claim 28, wherein the hue data includes six hue data r, g, b, y, m and c, and when the first color data is represented by Ci, Mi and Yi, and a minimum value and maximum value of the first color data are represented by $\alpha$ and $\beta$, the six hue data are calculated by the following equations:

$$r=\beta-Ci,\ g=\beta-Mi,\ b=\beta-Yi,\ y=Yi-\alpha,\ m=Mi-\alpha,\ c=Ci-\alpha.$$

31. A color conversion device for converting a first color data into a second color data comprising:

a hue data calculator for calculating a plurality of hue data representing hue of the first color data;

a first coefficient generator for providing calculation coefficients for designating an area in one of a plurality of inter-hue regions, wherein said inter-hue region are between adjacent hues of red, green, blue, cyan, magenta and yellow;

a calculator for generating calculation terms, each of which is substantially effective for one of the inter-hue regions based on the hue data and the calculation coefficients, wherein the calculation term has a peak value in the area designated by the calculation coefficients;

a second coefficient generator for providing predetermined matrix coefficients; and a matrix calculator for performing a matrix calculation using the matrix coefficients and the calculation terms to produce the second color data.

32. The device according to claim 31, wherein the hue data calculator calculates six hue data r, g, b, y, m and c, and when the first color data is represented by Ri, Gi and Bi, and a minimum value and maximum value of the first color data are represented by $\alpha$ and $\beta$, the hue data calculate the six hue data by the following equations:

$$r=Ri-\alpha,\ g=Gi-\alpha,\ b=Bi-\alpha,\ y=\beta-Bi,\ m=\beta-Gi,\ c=\beta-Ri.$$

33. The device according to claim 31, wherein the hue data calculator calculates six hue data r, g, b, y, m and c, and when the first color data is represented by Ci, Mi and Yi, and a minimum value and maximum value of the first color data are represented by $\alpha$ and $\beta$, the hue data calculator calculates the six hue data by the following equations:

$$r=\beta-Ci,\ g=\beta-Mi,\ b=\beta-Yi,\ y=Yi-\alpha,\ m=Mi-\alpha,\ c=Ci-\alpha.$$

* * * * *